(12) United States Patent
Etter et al.

(10) Patent No.: US 11,630,291 B2
(45) Date of Patent: Apr. 18, 2023

(54) METHOD OF FABRICATING AN OPTICAL ASSEMBLY

(71) Applicant: 3M INNOVATIVE PROPERTIES COMPANY, St. Paul, MN (US)

(72) Inventors: Jo A. Etter, Kirkland, WA (US); Timothy L. Wong, St. Paul, MN (US); Zhisheng Yun, Sammamish, WA (US); Gregg A. Ambur, River Falls, WI (US); Benjamin G. Sonnek, Mahtomedi, MN (US); Robert M. Jennings, Shoreview, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 0 days.

(21) Appl. No.: 17/583,598

(22) Filed: Jan. 25, 2022

(65) Prior Publication Data

US 2022/0146803 A1 May 12, 2022

Related U.S. Application Data

(63) Continuation of application No. 16/495,356, filed as application No. PCT/IB2018/053360 on May 14, 2018, now Pat. No. 11,262,565.

(Continued)

(51) Int. Cl.
  *G02B 17/08* (2006.01)
  *G02B 5/30* (2006.01)
  *G02B 27/28* (2006.01)

(52) U.S. Cl.
  CPC ......... *G02B 17/0856* (2013.01); *G02B 5/305* (2013.01); *G02B 5/3025* (2013.01);
  (Continued)

(58) Field of Classification Search
  CPC ............ G02B 17/0856; G02B 17/0804; G02B 5/3025; G02B 5/305; G02B 5/3083;
  (Continued)

(56) References Cited

U.S. PATENT DOCUMENTS

| 6,008,947 A | 12/1999 | Togino |
| 6,335,838 B1 | 1/2002 | Kasai |

(Continued)

FOREIGN PATENT DOCUMENTS

| CN | 105676477 | 6/2016 |
| EP | 2682807 | 1/2014 |

OTHER PUBLICATIONS

Unti, "Best-Fit Sphere Approximation to a General, Aspheric Surface", Applied Optics, Feb. 1966, vol. 5, No. 2, pp. 319-321.

(Continued)

*Primary Examiner* — Derek S. Chapel
*Assistant Examiner* — Adam W Booher
(74) *Attorney, Agent, or Firm* — Clifton F. Richardson

(57) ABSTRACT

A method of fabricating an optical assembly includes providing a first mold having a first curved mold surface; placing a substantially flat reflective polarizer; on the first curved mold surface and applying at least one of pressure and heat to at least partially conform the reflective polarizer to the first curved mold surface; providing a second mold comprising a second mold surface, the first and second mold surfaces defining a mold cavity therebetween; substantially filling the mold cavity with a flowable material having a temperature greater than a glass transition temperature of the reflective polarizer; and solidifying the flowable material to form a solid optical element bonded to the reflective polarizer. A maximum variation of an orientation of a pass polarization state across the bonded reflective polarizer is within about 3 degrees of a maximum variation of the (Continued)

orientation of the pass polarization state across the substantially flat reflective polarizer.

20 Claims, 17 Drawing Sheets

Related U.S. Application Data

(60) Provisional application No. 62/506,984, filed on May 16, 2017.

(52) U.S. Cl.
CPC ....... *G02B 5/3083* (2013.01); *G02B 17/0804* (2013.01); *G02B 27/28* (2013.01)

(58) Field of Classification Search
CPC ...... G02B 5/30; G02B 5/3033; G02B 5/3041; G02B 27/28; G02B 3/0012; G02B 3/0031; G02B 5/28; B29D 11/00548
See application file for complete search history.

(56) References Cited

U.S. PATENT DOCUMENTS

| | | | |
|---|---|---|---|
| 6,349,004 | B1 | 2/2002 | Fischer |
| 9,557,568 | B1 | 1/2017 | Ouderkirk |
| 10,394,040 | B2 | 8/2019 | Collier |
| 2002/0024743 | A1 | 2/2002 | Endo |
| 2010/0254002 | A1 | 10/2010 | Merrill |
| 2015/0146166 | A1 | 5/2015 | Weber |
| 2018/0039052 | A1* | 2/2018 | Khan .................. G02B 27/283 |

OTHER PUBLICATIONS

Perry, "Electrostatics Advantageous for In-Mold Labeling", Plastic Decorating, Oct. 2005, [retrieved from the internet on Nov. 15, 2019], URL<http://archive.plasticsdecorating.com/articlesdisplay.asp?ID=52>, 5 pages.

International Search Report for PCT International Application No. PCT/IB2018/053360, dated Dec. 4, 2018, 6 pages.

* cited by examiner

METHOD OF FABRICATING AN OPTICAL ASSEMBLY

BACKGROUND

Many displays, including virtual reality (VR) displays, attempt to present realistic images that replicate a real or imaginary environment. In some applications, VR displays attempt to provide immersive simulation of a three-dimensional environment.

SUMMARY

In some aspects of the present description, an optical system for displaying an image to a viewer is provided. The optical system includes first and second optical lenses, a partial reflector, a reflective polarizer and a first retarder layer. The first optical lens has an optical birefringence less than about 15 nm/cm, a curved first major surface having a best-fit spherical first radius of curvature in a range from about 20 mm to about 200 mm, and an opposing second major surface having a best-fit spherical second radius of curvature greater than about 500 mm. The curved first major surface concave toward the second major surface. The second optical lens has an optical birefringence greater than about 15 nm/cm, a curved first major surface facing and convex toward the second major surface of the first optical lens and having a best-fit spherical first radius of curvature in a range from about 14 mm to about 250 mm, and an opposing second major surface having a best-fit spherical second radius of curvature greater than about 125 mm. The partial reflector is disposed on and conforms to the first curved major surface of the first optical lens and has an average optical reflectance of at least 30% in a predetermined wavelength range. The reflective polarizer is disposed on and conforms to the curved first major surface of the second optical lens. The reflective polarizer substantially reflects light having a first polarization state and substantially transmits light having an orthogonal second polarization state in the predetermined wavelength range. The first retarder layer is disposed on and conforms to the second major surface of the first optical lens.

In some aspects of the present description, an optical system for displaying an image to a viewer is provided. The optical system includes spaced apart first and second optical lenses with no optical lenses disposed between the first and second optical lenses, a partial reflector, a reflective polarizer, and a first retarder layer disposed between the reflective polarizer and the partial reflector. The first optical lens comprises a glass and the second optical lens comprises a plastic. Each of the first and second optical lenses has opposing first and second major surfaces. A ratio of radii of curvature of best-fit spheres to the first and second major surfaces of the first optical lens is greater than about 5. A ratio of radii of curvature of best-fit spheres to the first and second major surfaces of the second optical lens in a range from about 1.5 to 10. The partial reflector is disposed on and conforms to a major surface of the first optical lens and has an average optical reflectance of at least 30% in a predetermined wavelength range. The reflective polarizer is disposed on and conforms to a major surface of the second optical lens. The reflective polarizer substantially reflects light having a first polarization state and substantially transmits light having an orthogonal second polarization state in the predetermined wavelength range. The optical system has an exit pupil defining an opening therein and an optical axis such that a light ray propagating along the optical axis passes through the first and second optical lenses, the partial reflector, the reflective polarizer, and the first retarder layer without being substantially refracted. The optical system is configured such that for a cone of light incident on the optical system from an object comprising a spatial frequency of about 40 line pairs per millimeter filling the exit pupil with a chief ray of the cone of light passing through a center of the opening of the exit pupil and making an angle of about 22.5 degrees with the optical axis, a modulation transfer function (MTF) of the optical system is greater than about 0.2.

In some aspects of the present description, an optical system for displaying an image to a viewer is provided. The optical system includes spaced apart first and second optical lenses with no optical lenses disposed between the first and second optical lenses, a partial reflector, a reflective polarizer, and a first retarder layer disposed between the reflective polarizer and the partial reflector. The first optical lens comprises a glass, and the second optical lens comprises a plastic and has opposing aspherical major surfaces. A ratio of radii of curvature of best-fit spheres to the opposing aspherical major surfaces is greater than about 1.1. The partial reflector is disposed on and conforms to a curved major surface of the first optical lens and has an average optical reflectance of at least 30% in a predetermined wavelength range. The reflective polarizer is disposed on and conforms to one of the aspherical major surfaces of the second optical lens. The reflective polarizer substantially reflects light having a first polarization state and substantially transmits light having an orthogonal second polarization state in the predetermined wavelength range. The optical system has an exit pupil defining an opening therein and an optical axis such that a light ray propagating along the optical axis passes through the first and second optical lenses, the partial reflector, the reflective polarizer, and the first retarder layer without being substantially refracted. A cone of light incident on the optical system from an object comprising a spatial frequency of about 40 line pairs per millimeter filling the exit pupil with a chief ray of the cone of light passing through a center of the opening of the exit pupil and making an angle θ with the optical axis, such that for at least one larger θ and at least one smaller θ, each greater than about 5 degrees, the optical system has a smaller modulation transfer function (MTF) for the larger θ and a larger MTF for a smaller θ.

In some aspects of the present description, an optical system for displaying an image to a viewer is provided. The optical system includes a first optical lens, a second optical lens, a partial reflector, a first retarder layer, and a reflective polarizer. The first optical lens has an optical birefringence less than about 15 nm/cm and has a curved first major surface and an opposite substantially flat second major surface. The partial reflector is disposed on and conforms to the curved first major surface of the first optical lens and has an average optical reflectance of at least 30% in a predetermined wavelength range. The first retarder layer is disposed on and conforms to the substantially flat second major surface of the first optical lens. The second optical lens is disposed adjacent to the first optical lens and has an optical birefringence greater than about 15 nm/cm. The second optical lens has a curved first major surface facing the first retarder layer and an opposite curved second major surface. The reflective polarizer is disposed on and conforms to the curved first major surface of the second optical lens. For normally incident light having a wavelength in the predetermined wavelength range, each location on the reflective polarizer has a maximum reflectance greater than about 70% for a first polarization state, a maximum transmittance greater than about 70% for an orthogonal second polarization state, and a minimum transmittance for the first polarization state. The maximum transmittances of at least one first, second and third location are within 1% of each other, where the at least one first location is near a center of the reflective polarizer and the at least one second and third locations are near an edge of the reflective polarizer. The at least one second location and the at least one third location subtend an angle in a range from about 30 degrees to about 110 degrees at the at least one first location.

In some aspects of the present description an optical system for displaying an image to a viewer is provided. The optical system includes a first optical lens, a second optical lens, a partial reflector, a first retarder layer and a reflective polarizer. The first optical lens has an optical birefringence less than about 15 nm/cm and has a curved first major surface and an opposite substantially flat second major surface. The partial reflector is disposed on and conforms to the curved first major surface of the first lens and has an average optical reflectance of at least 30% in a predetermined wavelength range. The first retarder layer is disposed on and conforms to the substantially flat second major surface of the first optical lens. The second optical lens is disposed adjacent to the first optical lens and has an optical birefringence greater than about 15 nm/cm. The second optical lens has a curved first major surface facing the first retarder layer and an opposite curved second major surface. The reflective polarizer is disposed on and conforms to the curved first major surface of the second optical lens. For normally incident light, each location on the reflective polarizer has a corresponding reflection band having a band edge wavelength, such that the band edge wavelengths of at least one first, second and third locations are within 2% of each other, where the at least one first location near a center of the reflective polarizer and the at least one second and third locations near an edge of the reflective polarizer, and the at least one second location and the at least one third location subtend an angle in a range from about 30 degrees to about 110 degrees at the at least one first location.

In some aspects of the present description, a method of fabricating an optical assembly is provided. The method includes providing a first mold comprising a first curved mold surface having a best-fit spherical first radius of curvature in a range from about 30 mm to about 1000 mm; providing a substantially flat reflective polarizer, each location on the reflective polarizer having a maximum reflectance greater than about 70% for a block polarization state and a maximum transmittance greater than about 70% for an orthogonal pass polarization state, a maximum variation of an orientation of the pass polarization state across the reflective polarizer being about θ1 degrees; placing the substantially flat reflective polarizer on the first curved mold surface and applying at least one of pressure and heat to at least partially conform the substantially flat reflective polarizer to the first curved mold surface; providing a second mold comprising a second mold surface spaced apart from and aligned with the first mold surface, the first and second mold surfaces defining a mold cavity therebetween; substantially filling the mold cavity with a flowable material having a temperature greater than a glass transition temperature of the reflective polarizer; and solidifying the flowable material to form a solid optical element bonded to the reflective polarizer. A maximum variation of an orientation of the pass polarization state across the bonded reflective polarizer is about θ2 degrees. θ1 and θ2 are within about 3 degrees of each other.

In some aspects of the present description, a method of fabricating an optical assembly is provided. The method includes providing a first mold comprising a first curved mold surface having a best-fit spherical first radius of curvature in a range from about 30 mm to about 1000 mm; providing a substantially flat reflective polarizer having an average reflectance greater than about 70% for a first polarization state in a predetermined wavelength range and an average transmittance greater than about 70% for an orthogonal second polarization state in the predetermined wavelength range, the substantially flat reflective polarizer having a first maximum thickness variation across the reflective polarizer; placing the substantially flat reflective polarizer on the first curved mold surface and applying at least one of pressure and heat to at least partially conform the substantially flat reflective polarizer to the first curved mold surface; providing a second mold comprising a second mold surface spaced apart from and aligned with the first mold surface, the first and second mold surfaces defining a mold cavity therebetween; substantially filling the mold cavity with a flowable material having a temperature greater than a glass transition temperature of the reflective polarizer; and solidifying the flowable material to form a solid optical element bonded to the reflective polarizer. The bonded reflective polarizer has a second maximum thickness variation across the reflective polarizer. The first and second maximum thickness variations are within 5% of each other.

In some aspects of the present description, a unitary multilayer optical film is provided. The unitary multilayer optical film includes a plurality of interference layers, each interference layer reflecting or transmitting light primarily by optical interference; and an outermost noninterference layer not reflecting or transmitting light primarily by optical interference and having an outermost surface comprising a regular pattern formed therein. The multilayer optical film is a unitary construction.

In some aspects of the present description, an optical assembly including an optical lens having a first major surface and an optical birefringence of at least about 15 nm/cm, and a reflective polarizer disposed on and conforming to the first major surface is provided. The optical assembly has a circular diattenuation such that in a top plan view, the circular diattenuation increases from a center of the reflective polarizer to an edge of the reflective polarizer in each of two opposite directions along a first axis and decreases from the center of the reflective polarizer to the edge of the reflective polarizer in each of two opposite directions along a different second axis.

DETAILED DESCRIPTION

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Figure 1A:
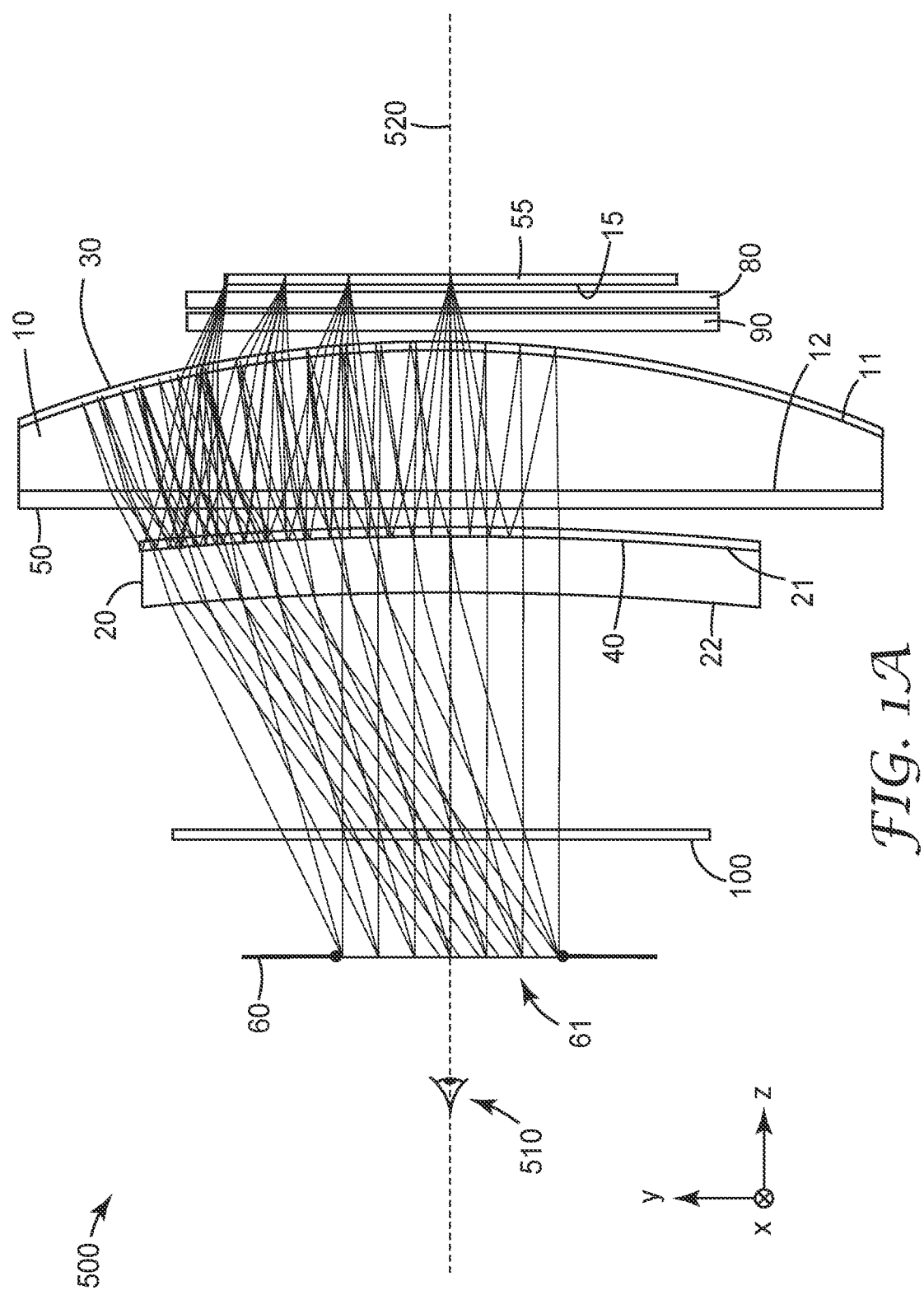
FIGS. 1A-1D are diagrams illustrating optical systems.

FIG. 1A is a diagram illustrating optical system 500 in accordance with some embodiments of the present description. Optical system 500 may be described as a folded optical system in which a light beam is bent as it traverses the system so that the optical path of the light is longer than the length of the system. Optical systems disclosed herein employ folded optics and are useful for head-mounted displays, such as virtual reality displays, and cameras, such as cameras included in a cell phone, for example. The disclosed optical systems include a reflective polarizer, multiple lenses, and/or a retarder disposed between a stop surface (e.g., an exit pupil or an entrance pupil) and an image surface (e.g., a surface of a display panel or a surface of an image recorder). These systems can provide an optical system having a high field of view, a high contrast, a low chromatic aberration, a low distortion, and/or a high efficiency in a compact configuration that is useful in various applications. Folded optical systems are described, for example, in U.S. Pat. No. 9,557,568 (Ouderkirk et al.) which is hereby incorporated herein by reference to the extent that it does not contradict the present description.

It can be desirable for a compact optical system for virtual reality applications to have high resolution (small spot size), and a wide field of view (FOV). The wide field of view provides for an immersive experience for the viewer. The small spot size makes the images sharp and clear. When traversing through the optical system from the image to the exit pupil, the spot size increases due to various aberrations including spherical aberrations, comatic aberrations, astigmatism, etc. Aberrations of the lenses and the wave-like nature of light can cause light originating from one point of the image 15 (see e.g., FIG. 1A) to be distributed over the exit pupil opening 61 apart from an ideal point's distribution. It is desired to reduce such aberrations to provide the desirable aspects of small spot size with a large field of view.

The modulation optical transfer function (MTF) is a measure of image quality characterizing the ability of an optical system to transfer contrast from an image 15 to the exit pupil opening 61. The MTF is related to spot size by Fourier transformation from the spatial domain (spot size) to the frequency domain (MTF). The MTF (and spot size) of an optical system can be expressed as a function of spatial frequency. Spatial frequency quantifies the level of detail present in an image at the exit pupil opening and is often specified in units of line pairs per mm. High spatial frequency images have a larger amount of detail than images of lower spatial frequency. MTF can be determined for tangential and sagittal orientations at different wavelengths of light and at different angles of light with respect to the optical axis.

Some embodiments disclosed herein are directed to folded optical systems that have a specified, e.g., high, MTF at a predetermined spatial frequency. The systems disclosed herein include optical lenses with optical qualities that, when used in conjunction with a reflective polarizer and at least one retarder layer, provide for the MTFs that enhance the viewer experience of an immersive three dimensional virtual environment.

FIG. 1A is a side view diagram of an optical system 500 in accordance with some embodiments. The optical system 500 is configured to display an image 15 to a viewer 510 through an opening 61. The optical system 500 includes a first optical lens 10 and a second optical lens 20. The first lens 10 is configured to receive the image 15 from an imager 55. In some configurations, the image incident on the first lens 10 is elliptically polarized. In some configurations, the image incident on the first lens 10 is circularly polarized.

The first lens 10 has a curved first major surface 11 and an opposing second major surface 12. The second lens 20 has a curved first major surface 21 and an opposing second major surface 22. In some embodiments, the curved first major surface 11 of the first lens 10 has a best-fit spherical first radius of curvature of at least about 20 mm, or at least about 25 mm, or at least about 30 mm. In some embodiments, the best-fit spherical first radius of curvature is no more than about 200 mm, or no more than about 150 mm, or no more than about 100 mm, or no more than 60 mm. For example, in some embodiments, the curved first major surface 11 of the first lens 10 has a best-fit spherical first radius of curvature in a range from about 20 mm to about 200 mm or in a range of about 25 mm to about 100 mm. In some embodiments, the curved first major surface 11 of the first optical lens 10 is an aspherical surface. In some embodiments, the second major surface 12 of the first lens 10 has a best-fit spherical second radius of curvature greater than about 500 mm, or greater than about 750 mm, or greater than about 1000 mm. In some embodiments, the second major surface 12 of the first optical lens 10 is an aspherical surface. In some embodiments, the second major surface 12 of the first optical lens 10 is flat or substantially flat. A surface of a lens in an optical system may be described as substantially flat if any curvature of the surface has a negligible effect on the optics of the optical system. In some embodiments, a substantially flat lens surface may have a best-fit spherical second radius of curvature greater than about 2 m or greater than about 5 m.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

In some embodiments, the curved first major surface 21 of the second optical lens 20 has a best-fit spherical first radius of curvature of at least about 14 mm, or at least about 25 mm, or at least about 30 mm, or at least about 50 mm, or at least about 75 mm, or at least about 100 mm, or at least about 110 mm. In some embodiments, the best-fit spherical first radius of curvature is no more than about 1000 mm, or no more than about 250 mm, or no more than about 200 mm, or no more than about 150 mm, or no more than about 140 mm. For example, in some embodiments, the curved first major surface 21 of the second optical lens 20 has a best-fit spherical first radius of curvature in a range from about 14 mm to about 250 mm or in a range of about 50 mm to about 200 mm. In some embodiments, the curved first major surface 21 of the second optical lens 20 is an aspherical surface. In some embodiments, the second major surface 22 of the second optical lens 20 has a best-fit spherical second radius of curvature of greater than about 125 mm, or at least about 200 mm, or at least about 500 mm. In some embodiments, the best-fit spherical second radius of curvature is no more than about 1000 mm, or no more than about 800 mm. For example, in some embodiments, the second major surface 22 of the second optical lens 20 has a best-fit spherical second radius of curvature in a range from about 200 mm to about 800 mm. In some embodiments, the second major surface 22 is an aspherical surface. In some embodiments, the second major surface 22 has a best-fit spherical second radius of curvature greater than about 1000 m. In some embodiments, the second major surface 22 is flat or substantially flat.

Figure 2A:
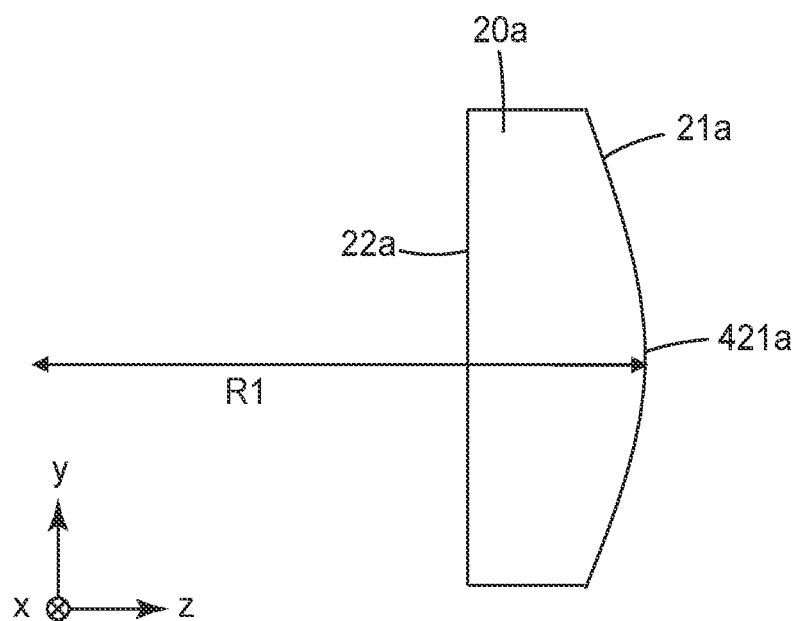
FIGS. 2A-2D are schematic cross-sectional views of optical lenses.
Figure 2B:
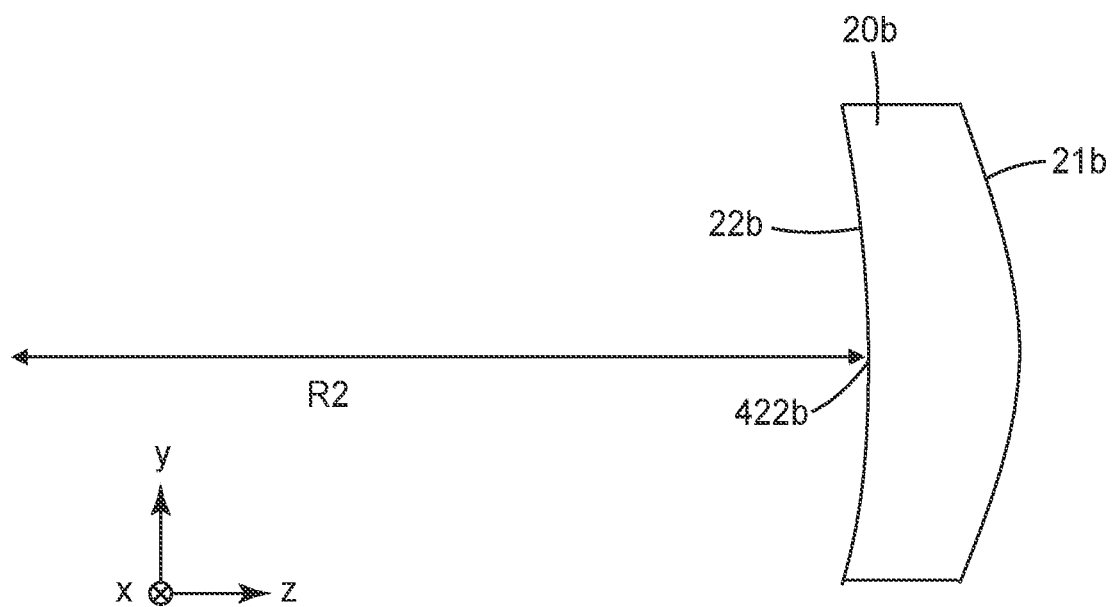
Figure 2C:
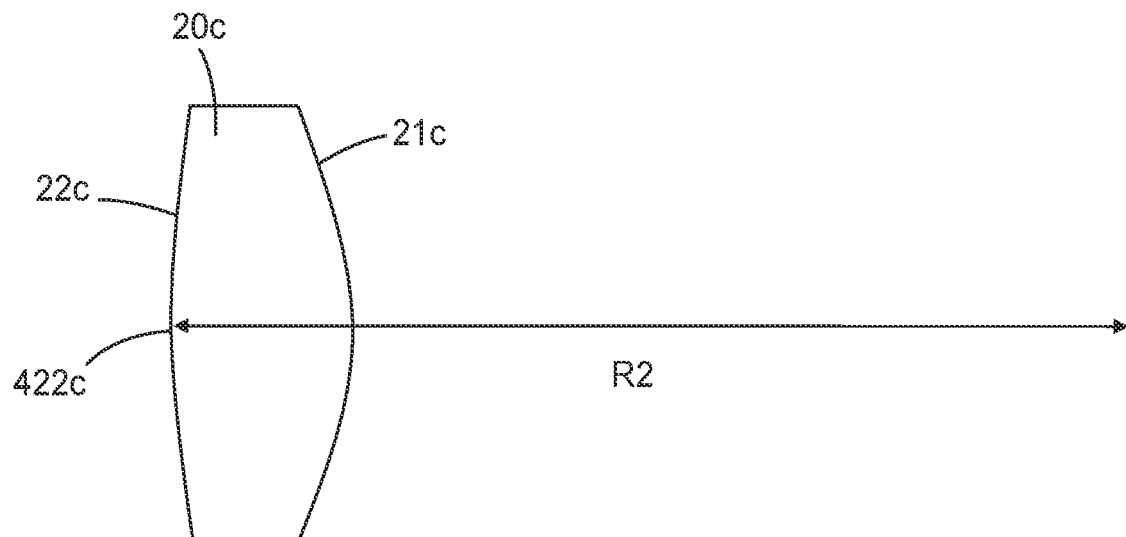
Figure 2D:
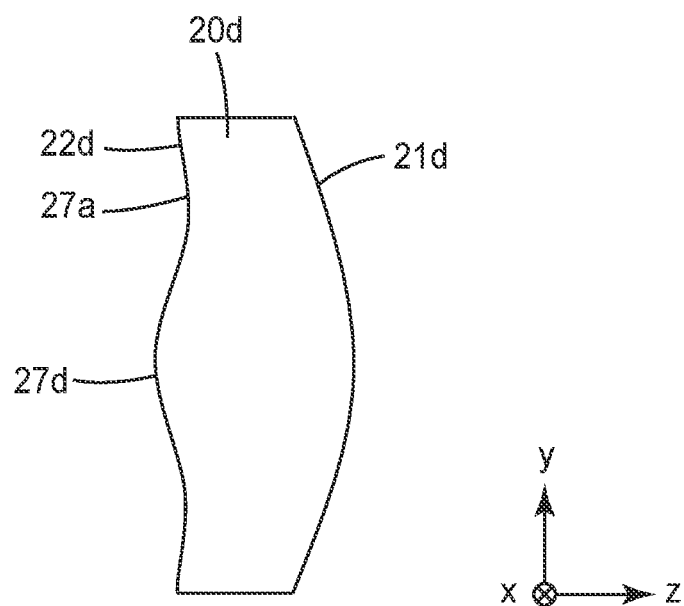

FIG. 2A is a schematic cross-sectional view of an optical lens 20a having a first major surface 21a concave towards a second major surface 22a which is flat in the illustrated embodiment. The first major surface 21a has a best-fit spherical radius of curvature of R1. The best-fit spherical radius of curvature of a surface is the radius of a sphere that minimizes the squared distance along a normal to the sphere from the sphere to the surface. The best-fit spherical radius of curvature can be determined using conventional least squares fitting techniques. The first major surface 21 has a radius of curvature at the vertex 421a which may be the same as R1 (e.g., for a spherical lens), larger than R1, or smaller than R1. FIG. 2B a schematic cross-sectional view of an optical lens 20b having opposing first and second major surfaces 21b and 22b. The second major surface 22b is convex towards the first major surface 21b and has a best-fit spherical radius of curvature of R2. The second major surface 22b has a radius of curvature at the vertex 422b which may be the same as R2 (e.g., for a spherical lens), larger than R2, or smaller than R2. FIG. 2C a schematic cross-sectional view of an optical lens 20c having opposing first and second major surfaces 21c and 22c. The second major surface 22c is concave towards the first major surface 21c and has a best-fit spherical radius of curvature of R2. The second major surface 22c has a radius of curvature at the vertex 422c which may be the same as R2 (e.g., for a spherical lens), larger than R2, or smaller than R2. FIG. 2D a schematic cross-sectional view of an optical lens 20d having opposing first and second major surfaces 21d and 22d. The second major surface 22d has a first portion 27a convex toward the first major surface 21d and a second portion 27d concave toward the first major surface 21d.

As shown in FIG. 1A, in some embodiments, the curved first major surface 11 is concave toward the second major surface 12. In some embodiments, the first major surface 21 of the second lens 20 faces and is convex towards the second major surface 12 of the first optical lens 10. In some embodiments, the second major surface 22 of the second optical lens 20 is convex toward the curved first major surface 21 of the second optical lens 20. In some embodiments, the second major surface 22 of the second optical lens 20 is concave toward the curved first major surface 21 of the second optical lens 20. In some embodiments, a first portion of the second major surface 22 of the second optical lens 20 is convex toward the curved first major surface 21 of the second optical lens 20, and another second portion of the second major surface 22 of the second optical lens 20 is concave toward the curved first major surface of the second optical lens. In some embodiments, the second major surface 22 of the second optical lens 20 is convex toward the curved first major surface 21 of the second optical lens 20 and has a best-fit spherical second radius of curvature greater than about 500 mm. in some embodiments, the second major surface 22 of the second optical lens 20 is concave toward the curved first major surface 21 of the second optical lens 20 and has a best-fit spherical second radius of curvature greater than about 500 mm.

In some embodiments, one or both of the first and second optical lenses has at least one aspherical surface. In some embodiments, an aspherical surface of an optical lens is described by Formula 1:

$$z = \frac{cr^2}{1 + [1 - (1+k)c^2 r^2]^{1/2}} + Dr^2 + Er^4 + Fr^6 + Gr^8 + Hr^{10} + Ir^{12} + Jr^{14} + \ldots \quad \text{(Formula 1)}$$

where r is a distance from the optical axis of the optical system to the aspherical surface, z is a distance along the optical axis from a vertex of the aspherical surface to a point on the aspherical surface, c is a curvature coefficient, k is a conic constant, and D, E, F, G, H, I, J are correction coefficients of the aspherical surface. In some embodiments, higher order terms (e.g., a $Kr^{16}$ term and/or an $Lr^{18}$ term and/or an $Mr^{20}$ term) are included, and in some embodiments all higher order terms are negligible so that the aspherical surface shape can be described by Formula 1 with no terms of higher order than $r^{14}$. The quantity c+2D is the curvature at the vertex of the aspherical surface. In some embodiments, D is zero or about zero so that its contribution to the shape of the aspherical surface is negligible. In this case, c is the curvature at the vertex of the aspherical surface and the radius of curvature at the vertex is 1/c. The correction coefficients may be specified without expressly reciting units with the understanding that z and r are expressed in mm. A correction coefficient may be described as being about zero if it is sufficiently small that the difference in the shape of the surface with the correction coefficient included and with it omitted is sufficiently small that it negligibly affects the optical performance of the optical system.

In some embodiments, the curved first major surface 11 of the first optical lens 10 is an aspherical surface. In some embodiments, this aspherical surface is described by Formula 1. In some embodiments, the conic constant k is in a range from about 3 to 7 (e.g., about 4.6). In some embodiments, a radius of curvature of the vertex of the aspherical surface is in a range from about 40 mm to 50 mm. In some embodiments, k is about 4.6, c is about 1/44.9 mm$^{-1}$, D is about zero, E is about −1.3E-06 (which may also written as −1.3×10$^{-6}$), F is about 6E-09, and G is about −1.6E-12. In some embodiments, H, I and J and higher order terms are zero or are about zero.

In some embodiments, the curved first major surface 21 of the second optical lens 20 is an aspherical surface. In some embodiments, this aspherical surface is described by Formula 1. In some embodiments, the conic constant k is in a range from about 3 to 7 (e.g., about 4.9). In some embodiments, a radius of curvature of the vertex of the aspherical surface is in a range from about 100 mm to 140 mm. In some embodiments, k is about 4.9, c is about $\frac{1}{120}$ mm$^{-1}$, D is about zero, E is about 2.5E-06, F is about zero, and G is about zero. In some embodiments, H, I and J and higher order terms are zero or are about zero.

In some embodiments, the second major surface 22 of the second optical lens 20 is an aspherical surface. In some embodiments, this aspherical surface is described by Formula 1. In some embodiments, the conic constant k is in a range from about 3 to 7 (e.g., about 4.9). In some embodiments, a radius of curvature of the vertex of the aspherical surface is in a range from about 210 mm to 250 mm. In some embodiments, k is about 4.9, c is about $\frac{1}{231}$ mm$^{-1}$, D is about zero, E is about −1.4E-05, F is about 2.1E-08, and G is about −9.3E-12. In some embodiments, H, I and J and higher order terms are zero or are about zero.

A partial reflector 30 is disposed on and conforms to the curved first major surface of the first optical lens 10. In some embodiments, the partial reflector 30 has an average optical reflectance of at least 30% in a predetermined wavelength range.

The partial reflector used in the optical systems of the present description may be any suitable partial reflector. For example, the partial reflector may be constructed by coating a thin layer of a metal (e.g., silver or aluminum) on a transparent substrate (e.g., a film which may then be adhered to a lens, or the substrate may be a lens). The partial reflector may also be formed by depositing thin-film dielectric coatings onto a surface of a lens substrate, or by depositing a combination of metallic and dielectric coatings on the surface, for example. In some embodiments, the partial reflector has an average optical reflectance and an average optical transmittance at a predetermined wavelength or in a predetermined wavelength range that are each in a range of 20% to 80%, or each in a range of 30% to 70%, or each in a range of 40% to 60%, or each in a range of 45% to 55%. The partial reflector may be a half mirror, for example. The average optical reflectance and average optical transmittance in a predetermined wavelength range refer to the unweighted average over the predetermined wavelength range and over polarizations of the optical reflectance and optical transmittance, respectively, determined at normal incidence unless indicated otherwise. The average optical reflectance and average optical transmittance at a predetermined wavelength refers to the unweighted average over polarizations of the optical reflectance and optical transmittance, respectively, determined at normal incidence unless indicated otherwise. In some embodiments, the partial reflector may be a reflective polarizer or may have a polarization dependent reflectivity. However, it is typically preferred that the normal incidence optical reflectance and optical transmittance are independent or substantially independent of polarization state of the incident light. Such polarization independence can be obtained using substantially isotropic metallic layers and/or dielectric layers, for example.

The optical system 500 includes a reflective polarizer 40 disposed on a major surface of the second optical lens 20. In the illustrated embodiment, the reflective polarizer 40 is disposed on and conforms to the first major surface 21 of the second optical lens 20. In other embodiments, the reflective polarizer 40 may be disposed on the second major surface 22 of the second optical lens 20. The reflective polarizer 40 substantially reflects light having one of orthogonal first and second polarization states (e.g., a first polarization state with the electric field along the x-axis) and substantially transmits light having the other of the first and second polarization states (e.g., a second polarization state with the electric field along the y-axis) in the predetermined wavelength range. A reflective polarizer may be said to substantially transmit light having a first polarization state in a predetermined wavelength range if at least 60 percent of light having the first polarization state in the predetermined wavelength range is transmitted through the polarizer. In some embodiments, at least 70 percent, or at least 80 percent, of light having the first polarization state in the predetermined wavelength range is transmitted through the polarizer. A reflective polarizer may be said to substantially reflect light having a second polarization state in a predetermined wavelength range if at least 60 percent of light having the second polarization state in the predetermined wavelength is reflected from the reflective polarizer. In some embodiments, at least 70 percent, or at least 80 percent, of light having the second polarization state and the predetermined wavelength is reflected from the polarizer.

The reflective polarizer used in the optical systems of the present description may be any suitable type of reflective polarizer. The reflective polarizer may be a polymeric multilayer optical film that may be substantially uniaxially oriented as described further elsewhere herein. Substantially uniaxially oriented reflective polarizers are available from 3M Company under the trade designation Advanced Polarizing Film or APF. Other types of multilayer optical film reflective polarizers (e.g., Dual Brightness Enhancement Film or DBEF available from 3M Company) may also be used. In some embodiments, other types of reflective polarizers (e.g., wire-grid polarizers) are used.

As illustrated in FIG. 1A, the optical system 500 includes a first retarder layer 50 disposed between the reflective polarizer 40 and the partial reflector 30. In the illustrated embodiment, the first retarder layer 50 is disposed on and conforms to the second major surface 12 of the first optical lens 10. The first retarder layer 50 can be substantially a quarter wave retarder at at least one wavelength in the predetermined wavelength range in some embodiments. Some configurations of the optical system 500 include a second retarder layer 90, where the first lens 10 is disposed between the second lens 20 and the second retarder layer 90. Optionally, the optical system 500 includes a first linear absorbing polarizer 80. For example, the second retarder layer 90 may be disposed between the first lens 10 and the first linear absorbing polarizer 80. Optionally, the optical system 500 includes a second linear absorbing polarizer 100, wherein the second lens 20 is disposed between the second linear absorbing polarizer 100 and the reflective polarizer 40.

In some embodiments, the optical system 500 includes each of the second retarder layer 90, the first linear absorbing polarizer 80, and the second linear absorbing polarizer 100. The first lens 10 is disposed between the second lens 20 and the second retarder layer 90. The second retarder layer 90 is disposed between the first lens 10 and the first linear absorbing polarizer 80. The second lens 20 is disposed between the second linear absorbing polarizer 100 and the reflective polarizer 40.

In some configurations, the predetermined wavelength range may comprise a wavelength of about 550 nm, e.g., may comprise the wavelength 587.6 nm. The predetermined wavelength range may extend from about 400 nm to about 700 nm in some embodiments. For example, the predetermined wavelength range can include a blue primary color wavelength, a green primary color wavelength, and a red primary color wavelength. The predetermined wavelength range may be any wavelength range over which the optical system is designed to operate. In some embodiments, the predetermined wavelength ranges include other wavelength ranges. For example, infrared (e.g., near infrared (about 700 nm to about 2500 nm)) and/or ultraviolet (e.g., near ultraviolet (about 300 nm to about 400 nm)) wavelengths as well as visible (400 nm to 700 nm) wavelengths may be included in the predetermined wavelength range.

The optical system 500 has an optical axis 520. The optical system is configured such that a light ray propagating along the optical axis 520 passes through the first and second optical lenses 10 and 20, the partial reflector 30, the reflective polarizer 40, and the first retarder layer 50 without being substantially refracted. In some configurations, at least one of the first and second optical lenses 10 and 20, the partial reflector 30, the reflective polarizer 40, and the first retarder layer 50 is rotationally symmetric. In some configurations, at least one of the first and second optical lenses 10 and 20, the partial reflector 30, the reflective polarizer 40, and the first retarder layer 50 is non-rotationally symmetric. In some configurations, at least one of the first and second lenses 10 and 20, the partial reflector 30, the reflective polarizer 40, and the first retarder layer 50 has at least one plane of symmetry.

The optical axis of an optical system or a display system or an optical lens or optical element in an optical system can be understood as an axis near the center of the system or a lens or optical element where a light ray propagating along the optical axis passes through the lenses and/or optical element(s) with a low or minimum degree of refraction so that light propagating along axes different from the optical axis experience greater degrees of refraction. In some embodiments, each of the lenses is centered on an optical axis through an apex of each of the lenses. The light ray along the optical axis may pass through the lenses and/or optical element(s) without being refracted or without being substantially refracted. Without being substantially refracted means that the angle between a light ray incident on a surface and a light ray transmitted through the surface is no more than 15 degrees. In some embodiments, an angle between the incident ray and the transmitted ray is less than 10 degrees, or less than 5 degrees, or less than 3 degrees, or less than 2 degrees. In some embodiments, the optical axis of an optical system is an axis such that a light ray propagating along the axis passes through the optical lenses, the partial reflector, the reflective polarizer and the retarder layer(s) without being substantially refracted. In some embodiments, a light ray propagating along the axis passes through the optical lenses, the partial reflector, the reflective polarizer and the retarder layer(s) without being refracted by more than 10 degrees, or more than 5 degrees, or more than 3 degrees, or more than 2 degrees at any major surface of the optical system.

The first and second optical lenses 10 and 20, of the optical system 500 may be made of any suitable material such as glass or plastic. The first optical lens 10 may comprise one or more of a borosilicate BK7 glass, a lanthanum crown LAK34, a lanthanum flint LAF7 glass, a flint F2 glass, a dense flint SF2, a lanthanum dense flint LASF45, and a fluorophosphate FPL51 and a fluorophosphate FPL55 glass. The second optical lens 20 may be made of plastic and may comprises one or more of polymethylmethacrylate (PMMA), a polystyrene, a polyvinyl alcohol, and a polycarbonate. In some embodiments, the first optical lens 10 is a monolithic glass element. In some embodiments, the second optical lens 20 is a monolithic plastic element.

In some embodiments, the first optical lens 10 is made from a glass having a low birefringence and the second optical lens 20 is made from a plastic which may have birefringence greater than that of the first optical lens 10. In some embodiments, the first optical lens 10 has a birefringence less than about 20 nm/cm, or less than about 15 nm/cm, or less than about 10 nm/cm, or less than about 7 nm/cm. In some embodiments, the second optical lens 20 has a birefringence greater than about 10 nm/cm, or greater than about 15 nm/cm, or greater than about 20 nm/cm. In some embodiments, the first optical lens 10 has a birefringence less than that of the second optical lens 20.

In some embodiments, the index of refraction of the material of the first optical lens 10 is about 1.44, or about 1.50 or about 1.52 at wavelengths of about 550 nm, e.g., 587.6 nm. In some embodiments, the second optical lens 20 has an index of refraction of about 1.49 or about 1.62 at about 550 nm, e.g., 587.6 nm.

As shown in FIG. 1A, the imager 55 can be disposed adjacent to and facing the first lens 10. The imager 55 emits the image 15 which is incident on the first lens 10. An exit pupil 60 is disposed adjacent and facing the second lens 20 and defines an opening 61 therein. The image 15 incident on the first lens 10 exits the optical system 500 through the opening 61 in the exit pupil 60. The image 15 incident on the first lens 10 may be elliptically polarized. The exiting image at the opening 61 may be substantially linearly polarized.

Figure 1B:
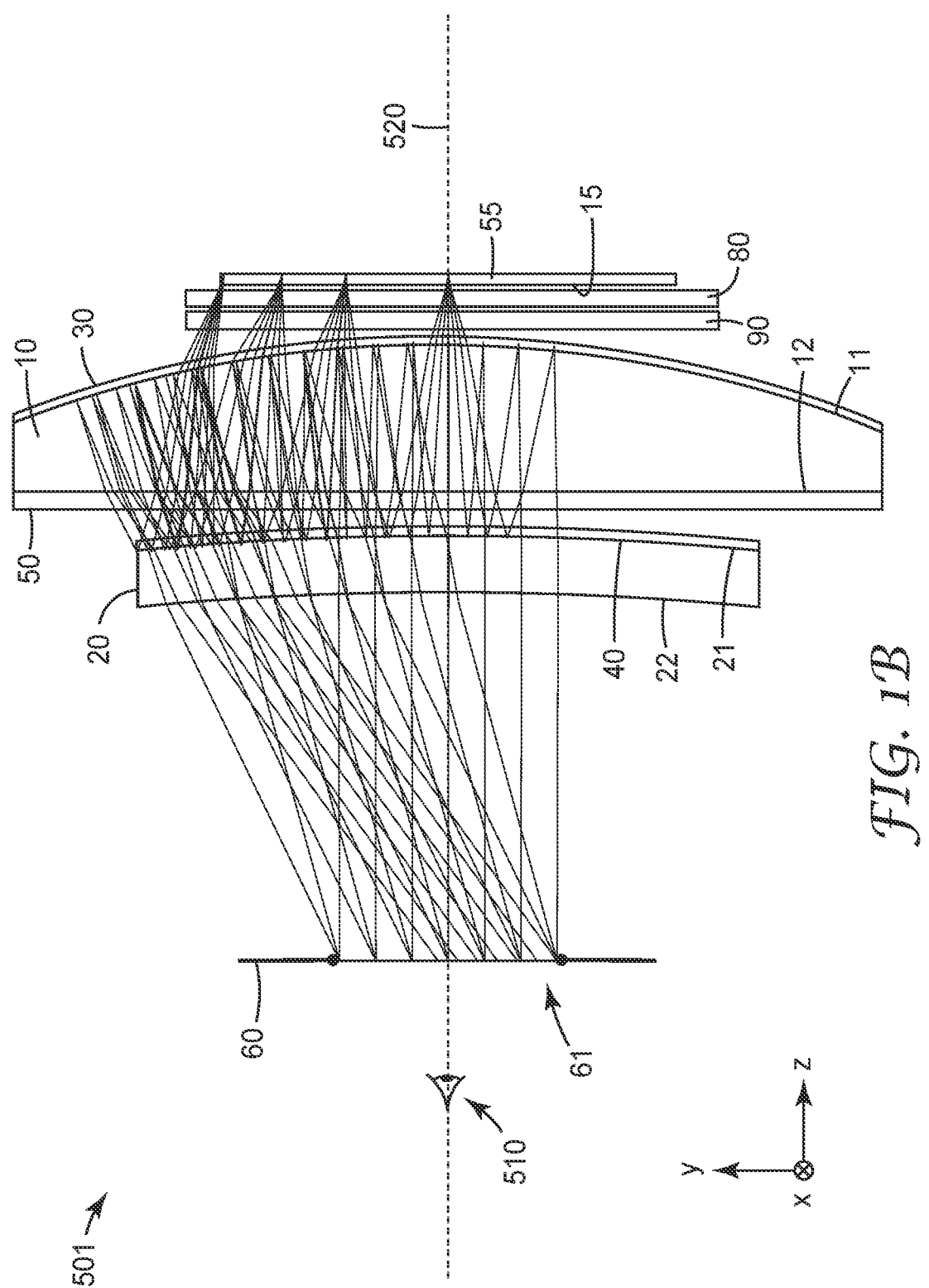

FIG. 1B shows an optical system 501 that is similar in many respects to the optical system 500 of FIG. 1A. Optical system 501 differs at least in that system 501 does not include the second linear absorbing polarizer (100 in FIG. 1A).

Figure 1C:
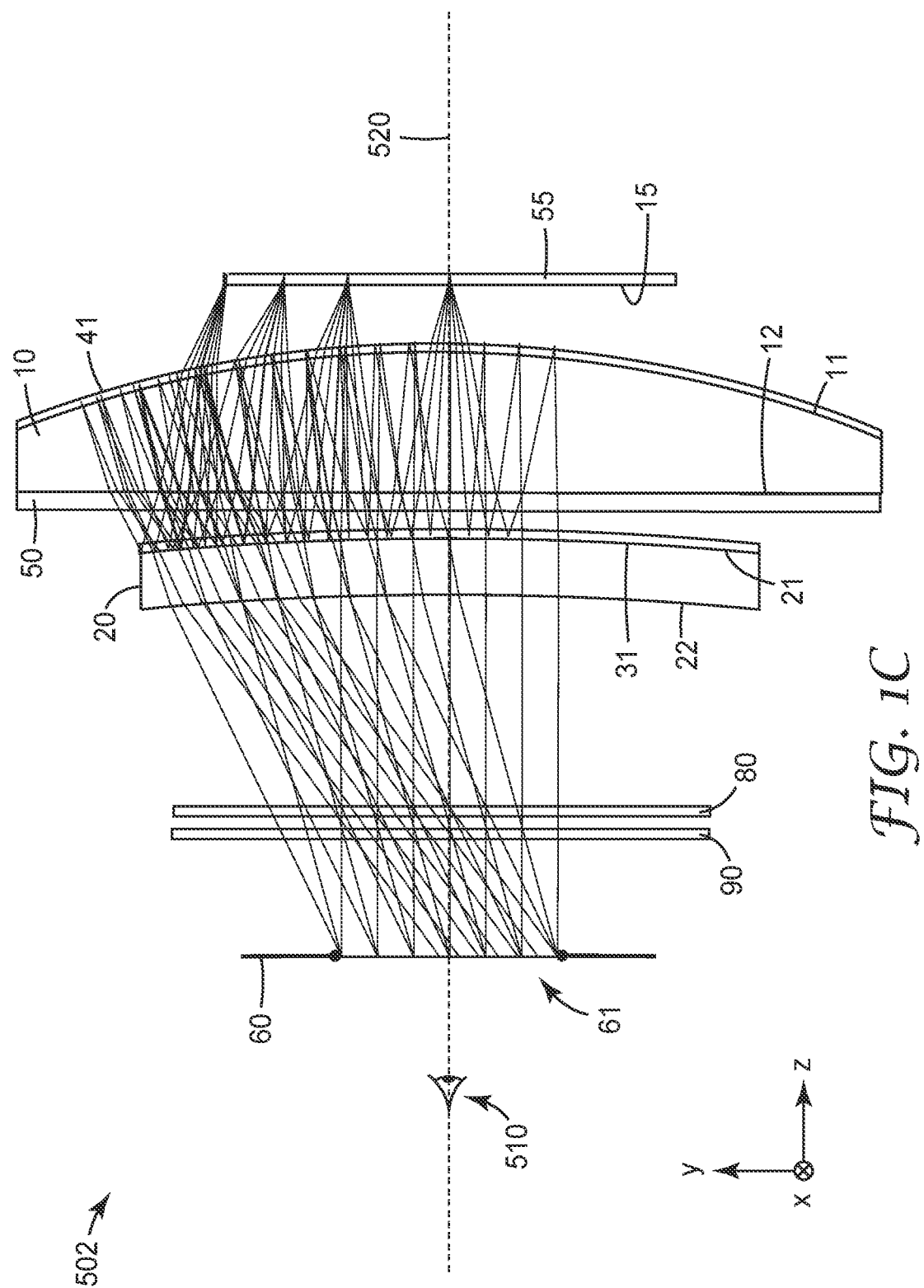

FIG. 1C shows another optical system 502 that has some similarities to FIG. 1A. The optical system 502 includes a partial reflector 31 disposed on and conforming to the first major surface 21 of the second lens 20. The system 502 also includes a reflective polarizer 41 disposed on and conforming to the first major surface 11 of the first lens 10. In the system 502, the second retarder layer 90 is disposed adjacent to the exit pupil 60. The first linear absorbing polarizer 80 is disposed between the second retarder layer 90 and the second lens 20.

Figure 1D:
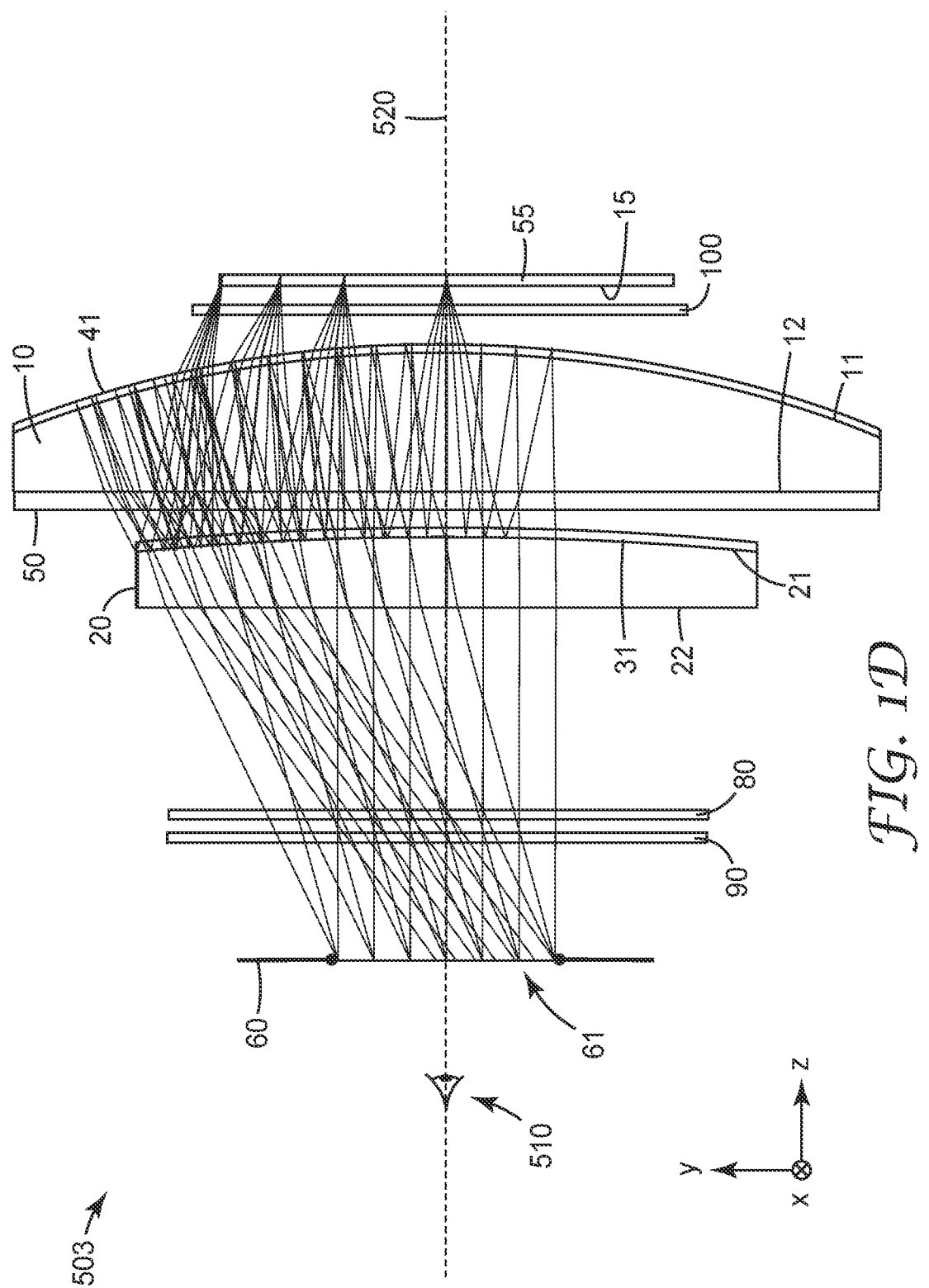

FIG. 1D shows yet another optical system 503 in accordance with some embodiments. FIG. 1D is similar in many respects to the system 502 of FIG. 1C. System 503 also includes a second linear absorbing polarizer 100 disposed between the imager 55 and the first lens 10.

Figure 3A:
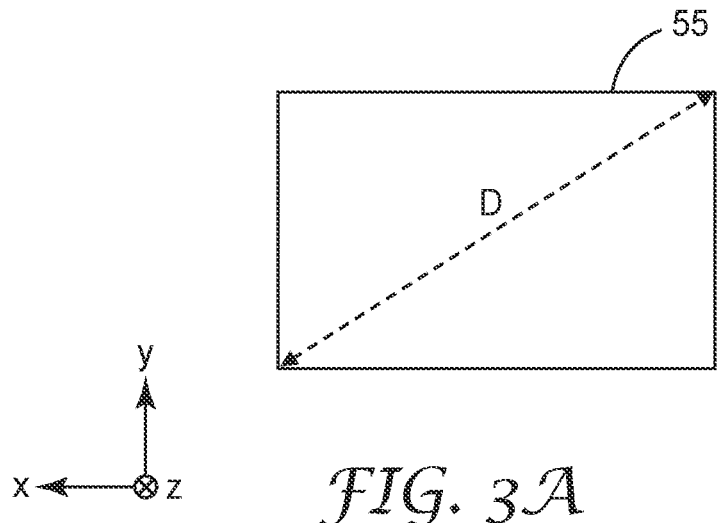
FIG. 3A shows an imager.
Figure 3B:
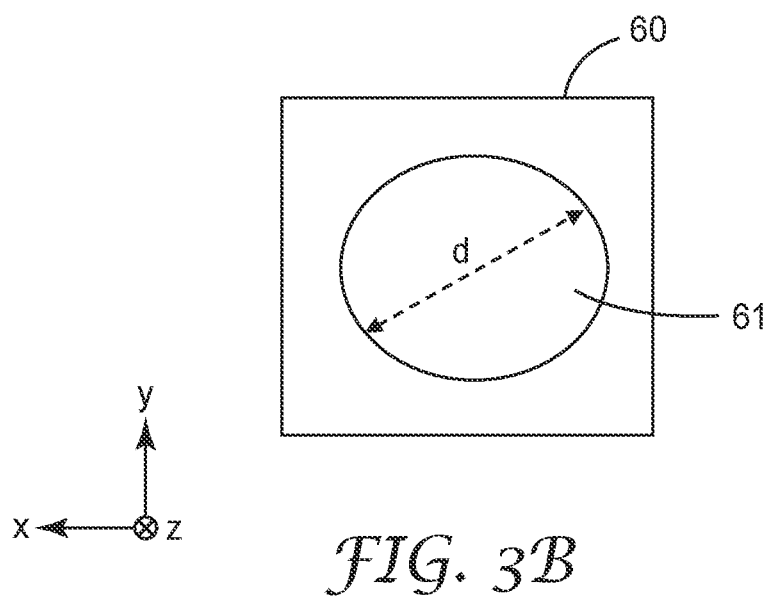
FIG. 3B shows the opening of the exit pupil of an optical system.

As shown in FIG. 3A, the imager 55 can be substantially a polygon. FIG. 3B shows the opening 61 of the exit pupil 60 which can be substantially circular. As shown in FIGS. 3A and 3B, a maximum lateral dimension of an active region of the imager is D (see FIG. 3A) and a maximum lateral dimension of the opening of the exit pupil is d (see FIG. 3B). In some embodiments the ratio D/d is between about 1 and about 20, e.g., 1≤D/d≤20. In some embodiments, the ratio of D/d is between about 2 and about 15, e.g., 2≤D/d≤15. In some embodiments the ratio of D/d is between about 5 and about 10, e.g., 5≤D/d≤10.

In some embodiments, the exit pupil 60 is a physical aperture defining the opening 61. In other embodiments, the exit pupil 60 is a virtual aperture. For example, the exit pupil 60 may be an image of an aperture stop of the optical system 500. In embodiments where the exit pupil 60 is a virtual aperture, the opening 61 in the exit pupil 60 refers to the interior region of the virtual aperture. The exit pupil 60 and/or the opening 61 may be rectangular, square, elliptical, circular, or may have some other shape. In some embodiments, the optical system 500 is a component of a head-mounted display configured such that when worn by a viewer 510, the exit pupil opening 61 overlaps the pupil of an eye of the viewer 510.

The maximum lateral dimension of the opening 61 of the exit pupil 60 can be in a range from about 2 mm to about 10 mm or in a range from about 2 mm to about 80 mm, for example. A separation between the exit pupil 60 and the second lens 20 can be in a range from about 5 mm to about 30 mm or in a range from about 10 mm to about 20 mm, for example.

Figure 4A:
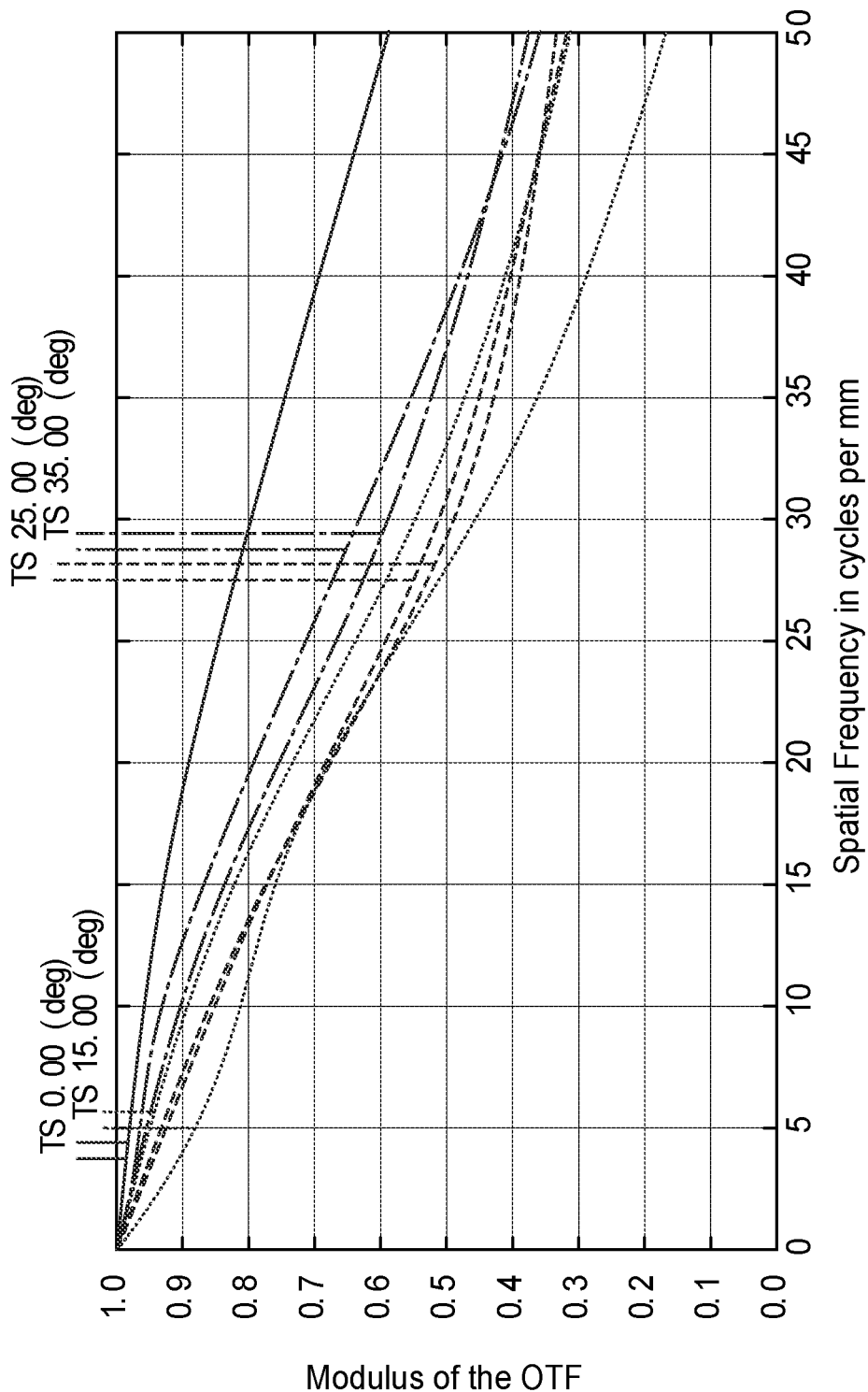
FIGS. 4A-4C show families of curves representing the modulation transfer function (Modulus of optical transfer function (OTF)) plotted as a function of the spatial frequency in cycles per millimeter (also referred to as line pairs per millimeter) for optical systems in accordance with some embodiments.
Figure 4B:
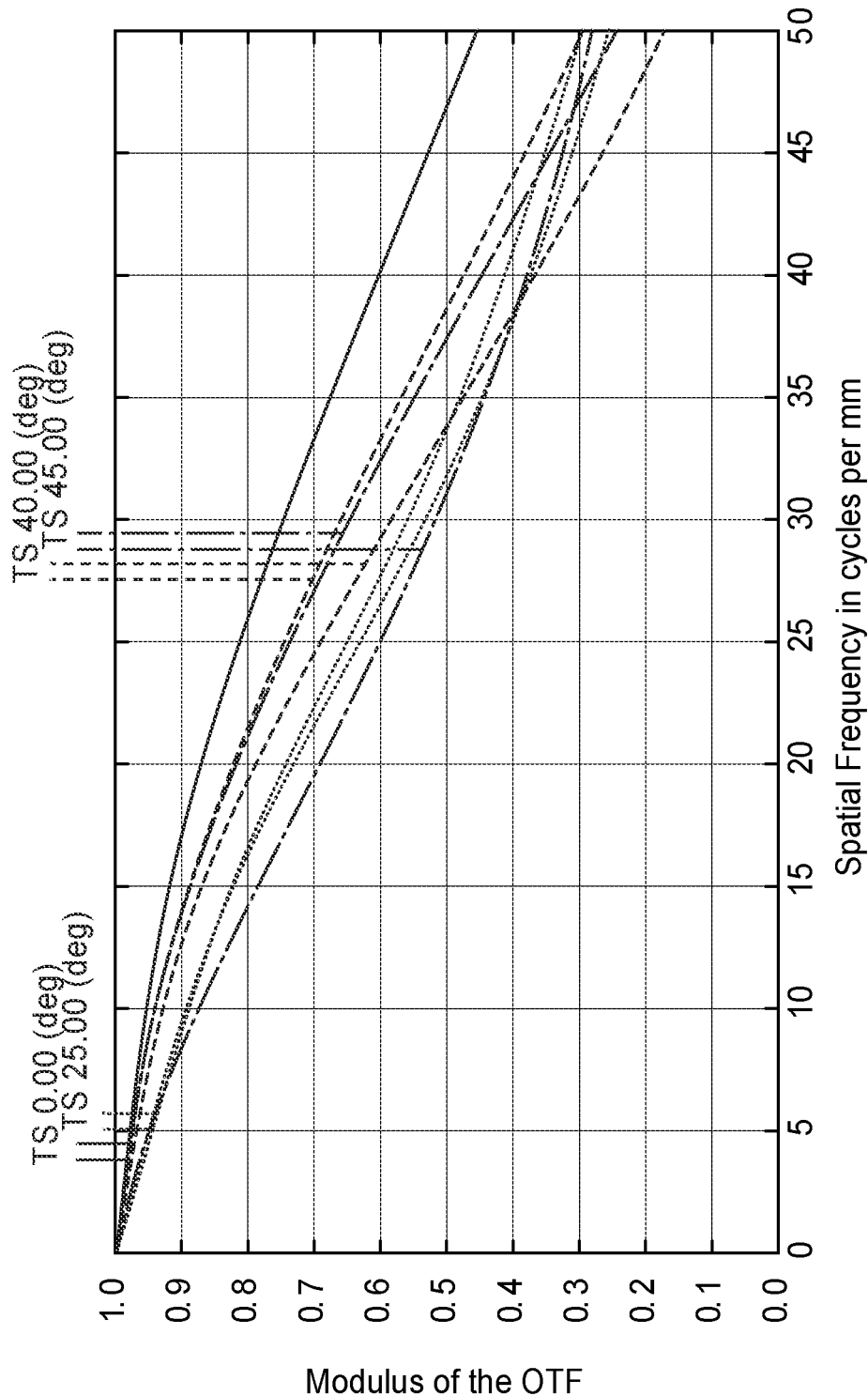
Figure 4C:
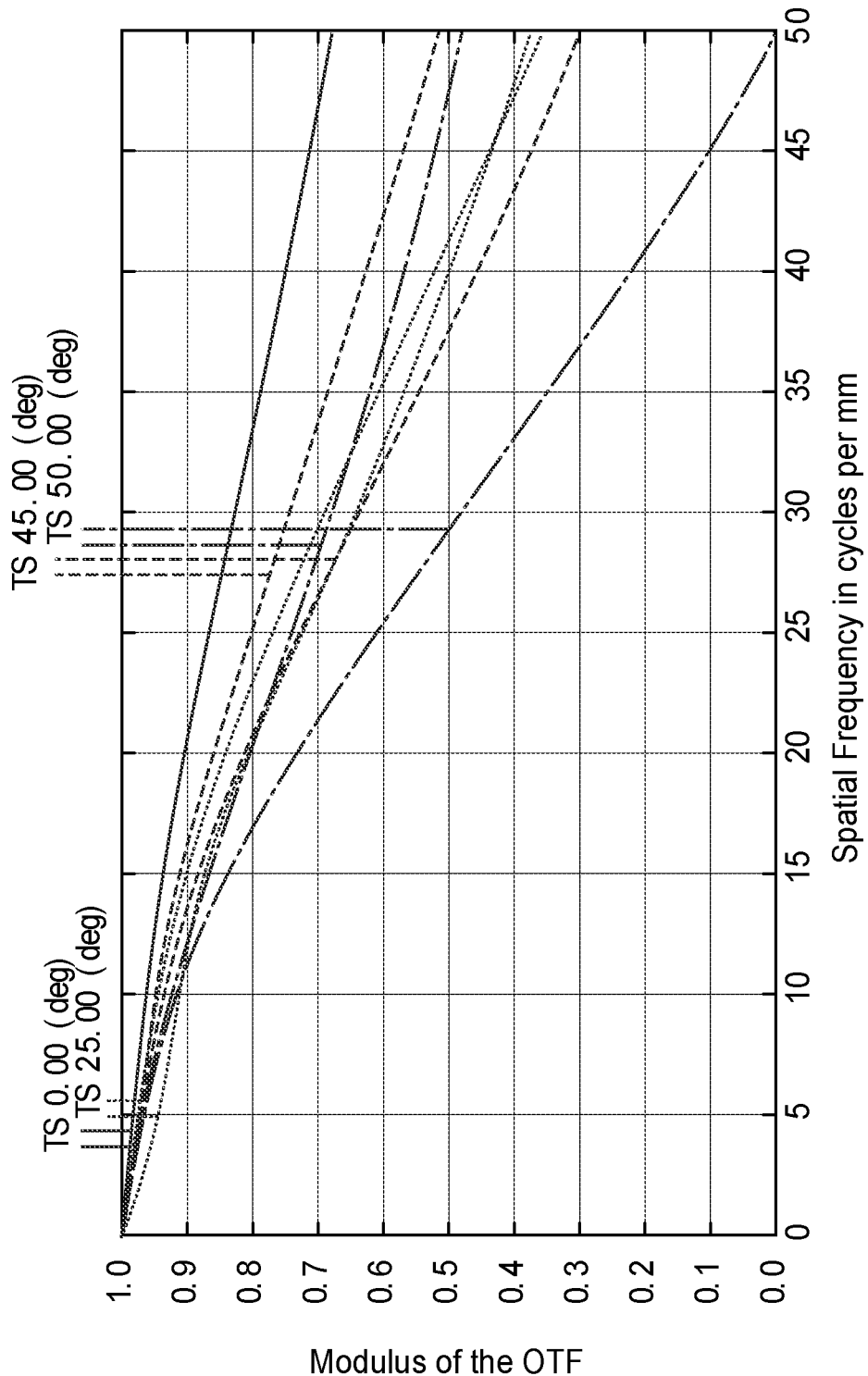

According to some embodiments, an optical system provides a specified modulation transfer function. FIGS. 4A-4C show families of curves representing the modulation transfer function (Modulus of optical transfer function (OTF)) plotted along the y axis as a function of the spatial frequency in cycles per millimeter (also referred to as line pairs per millimeter) along the x-axis. The family of curves provides the MTF vs. spatial frequency for the optical system 500 for various angles of light at the exit pupil opening 61 with respect to the optical axis 520 of the optical system 500 for three embodiments of the optical system 500 determined by optical modeling. In the embodiment of FIG. 4A, the focal length was 18.2 mm, the field of view was 70 degrees, the image height was 12.7 mm, the f-number was 1.8, the eye relief was 17 mm and the eye box was 10 mm. In the embodiment of FIG. 4B, the focal length was 18.2 mm, the field of view was 90 degrees, the image height was 18.1 mm, the f-number was 1.8, the eye relief was 17 mm and the eye box was 10 mm. In the embodiment of FIG. 4C, the focal length was 15.85 mm, the field of view was 100 degrees, the image height was 18.9 mm, the f-number was 2.3, the eye relief was 14 mm and the eye box was 7 mm. In each of the embodiments of FIG. 4A-4C, the second lens 20 was modeled as an acrylic lens. In the embodiments of FIGS. 4A and 4B, the first lens 10 was modeled as a borosilicate BK7 glass, and in the embodiment of FIG. 4C, the first lens 10 was modeled as a low birefringence acrylate. In FIG. 4A, the MTF vs. spatial frequency curves are plotted for 0, 15, 25, and 35 degree angles of light at the exit pupil opening 61 for both tangential (T) and sagittal (S) orientations. In FIG. 4B, the MTF vs. spatial frequency curves are plotted for 0, 25, 40, and 45 degree angles of light at the exit pupil opening 61 for both tangential (T) and sagittal (S) orientations. In FIG. 4C, the MTF vs. spatial frequency curves are plotted for 0, 25, 45, and 50 degree angles of light at the exit pupil opening 61 for both tangential (T) and sagittal (S) orientations.

Figure 5:
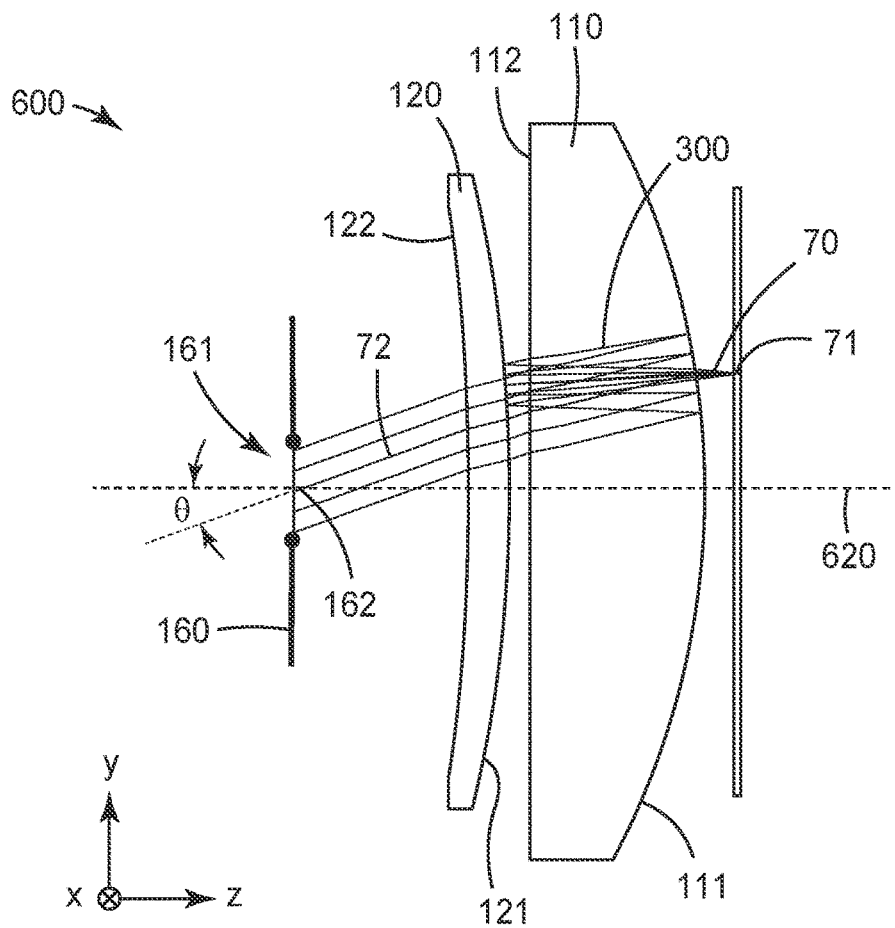
FIG. 5 illustrates an optical system in which a chief ray of the cone of light from an object passes through the center of the opening of the exit pupil and makes an angle of θ with the optical axis.

FIG. 5 is a schematic cross-sectional view of optical system 600 which may correspond to optical system 500. Optical system 600 is configured to display an image to a viewer and includes spaced apart first 110 and second 120 optical lenses with no optical lenses disposed between the first and second optical lenses 110 and 120. In some embodiments, the first lens 110 comprising a glass and the second lens 120 comprises a plastic. In some embodiments, each of the first and second optical lenses 110 and 120 comprising opposing first and second major surfaces, and a ratio of radii of curvature of best-fit spheres to the first and second major surfaces 111 and 112 of the first optical lens 110 is greater than about 5, and a ratio of radii of curvature of best-fit spheres to the first and second major surfaces 121 and 122 of the second optical lens 120 can be in a range from about 1.1 or from about 1.5 to about 10. In some embodiments, the first and second major surfaces 121 and 122 of the second lens 120 are opposing aspherical major surfaces and a ratio of radii of curvature of best-fit spheres to the opposing aspherical major surfaces is greater than about 1.1 or greater than about 1.5. In some embodiments, a partial reflector is disposed on and conforms to a major surface (first major surface 111 in the illustrated embodiment) of the first optical lens 110. In some embodiments, a reflective polarizer is disposed on and conforms to a major surface (first major surface 121 in the illustrated embodiment) of the second optical lens 120. A first retarder layer is disposed between the reflective polarizer and the partial reflector (e.g., on second major surface 112 of the first optical lens 110). The optical system 600 has an exit pupil 160 defining an opening 161 therein. The optical system 600 has an optical axis 620 such that a light ray propagating along the optical axis 620 passes through the first and second optical lenses 110 and 120, the partial reflector, the reflective polarizer, and the first retarder layer without being substantially refracted.

As shown in FIG. 5, a cone of light 70 is incident on the optical system 600 from an object 71 and fills the exit pupil opening 161. A chief ray 72 of the cone of light 70 passes through a center 162 of the opening 161 of the exit pupil 160 and makes an angle θ with the optical axis 620. A marginal ray 300 of the cone of light 70 passes though the exit pupil 160 at an edge of the opening 161. The cone of light 70 may comprise a spatial frequency of about 40 line pairs per millimeter and the modulation transfer function (MTF) of the optical system 600 may be greater than about 0.2 or greater than about 0.25, or even greater than about 0.3 when the angle θ is about 22.5 degrees. In some embodiments, the cone of light 70 comprise a spatial frequency of about 30 line pairs per millimeter, or about 40 line pairs per millimeter, or about 50 line pairs per millimeter, or about 60 line pairs per millimeter, or about 70 line pairs per millimeter, and the modulation transfer function (MTF) of the optical system 600 is greater than about 0.1, or greater than about 0.15, or greater than about 0.2 or greater than about 0.25, or even greater than about 0.3 when the angle θ is about 22.5 degrees. For example, in the embodiments of FIGS. 4A-4B, both the tangential and the sagittal MTFs are about 0.3 or greater for each of the angles θ shown in the plots at about 40 line pairs per millimeter, and in the embodiment of FIG. 4C, each of the tangential MTFs and each of the sagittal MTFs except for θ=50 degrees are about 0.3 or greater.

In some embodiments, for at least one larger θ and at least one smaller θ, each greater than about 5 degrees, the optical system 600 has a smaller modulation transfer function (MTF) for the larger θ and a larger MTF for the smaller θ at a spatial frequency of about 40 line pairs per millimeter. It is the corresponding MTF (e.g., tangential or sagittal or average of the two) that is to be compared at the larger and smaller θ. For example, the sagittal MTF for θ of 25 degrees is smaller than the sagittal MTF for θ of 15 degrees at a spatial frequency of about 40 line pairs per millimeter in the embodiment of FIG. 4A. In the embodiment of FIG. 4B, the tangential MTF for θ of 45 degrees is smaller than the tangential MTF for θ of 40 degrees at a spatial frequency of about 40 line pairs per millimeter. In the embodiment of FIG. 4C, the sagittal MTF for θ of 50 degrees is smaller than the sagittal MTFs for θ of 45 or 25 degrees at a spatial frequency of about 40 line pairs per millimeter.

Various cones of light emitted by imager 55 are shown in FIG. 1A, for example. In the illustrated embodiment, each chief ray of the cones of light passes through a center of the exit pupil opening 61 and makes an angle with the optical axis 520 which is 0 degrees for the chief ray emitted along the optical axis 520 and increase with distance in the y-direction from the optical axis 520. In some embodiments, the angle with the optical axis 520 is at least about 35 or at least about 45 degrees for a chief ray emitted from an edge of the imager.

In some aspects of the present description, methods of fabricating optical assemblies are provided. In some embodiments, the resulting optical assemblies have improved properties compared to other optical assemblies made using conventional techniques, as described further elsewhere herein. In some embodiments, the optical assembly is formed by insert molding a lens onto an optical film without pre-forming the optical film before the molding process. This has been found to reduce or eliminate defects such as buckling or tearing of the optical film. The optical assembly may include an optical lens (e.g. second optical lens 20 or 120) and a reflective polarizer disposed on and conforming to a major surface of the optical lens.

Figure 6A:
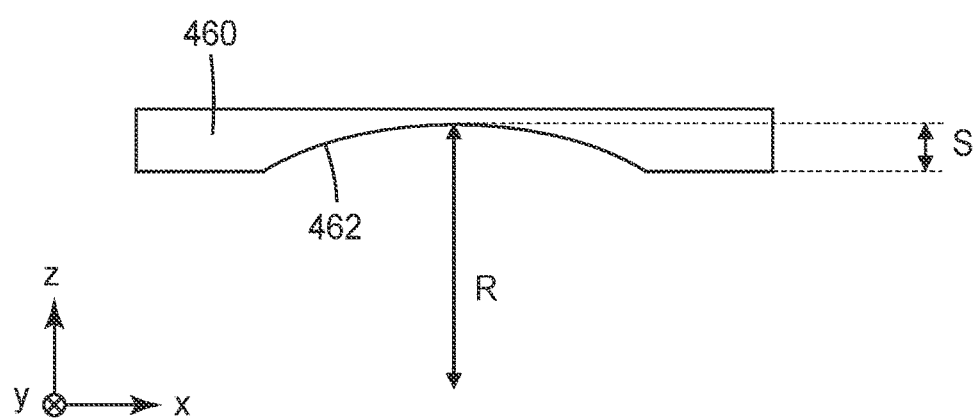
FIGS. 6A-6D schematically illustrates a method for fabricating an optical assembly.
Figure 6B:
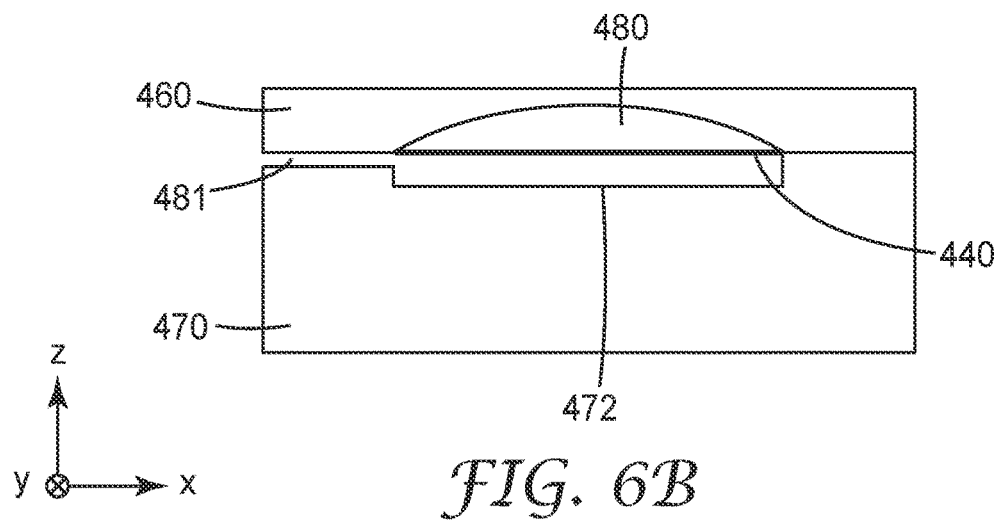
Figure 6C:
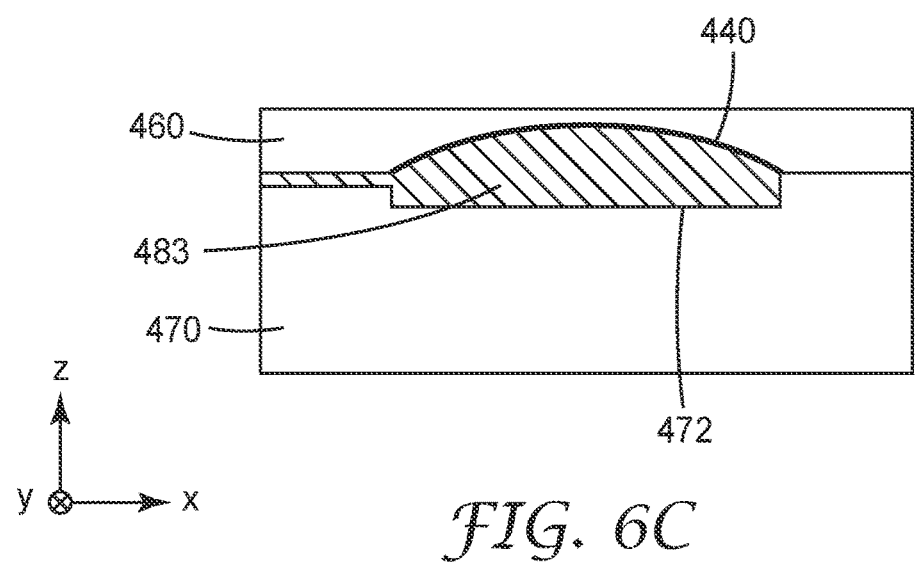
Figure 6D:
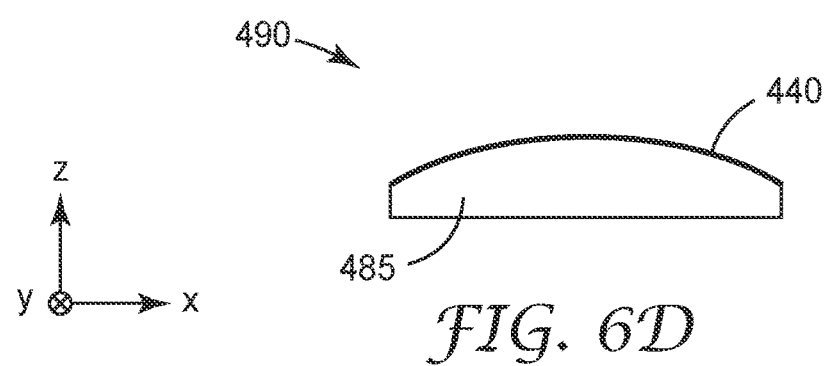

FIGS. 6A-6D schematically illustrate a method of fabricating an optical assembly. The method includes: providing a first mold 460 having a first curved mold surface 462 (FIG. 6A); placing a substantially flat optical film 440 on the first curved mold surface 462 and applying at least one of pressure and heat to at least partially conform the optical film 440 to the first curved mold surface 462 (FIGS. 6B-6C); providing a second mold 470 comprising a second mold surface 472 spaced apart from and aligned with the first mold surface 462, the first and second mold surfaces 462 and 472 defining a mold cavity 480 therebetween (FIG. 6B); substantially filling the mold cavity 480 with a flowable material 483 (FIG. 6C); and solidifying the flowable material to form a solid optical element 485 bonded to the optical film 440 (FIG. 6D).

The solid optical element bonded to the optical film may be referred to as an optical assembly and may correspond to the lens 20 bonded to the reflective polarizer 40, for example. The first and second molds 460 and 470 may be removed and any excess material (e.g., runner material from gate 481) removed to provide the optical assembly 490 depicted in FIG. 6D. Substantially filling the mold cavity can be understood to mean filling the mold cavity to greater than 50 percent by volume. In some embodiments, the mold cavity is filled to at least 80 percent by volume, or to at least 90 percent by volume, or to at least 95 percent by volume. In some embodiments, the mold cavity 480 is completely filled with flowable material 483 except for the volume occupied by the optical film 440.

In some embodiments, the optical film 440 is conformed to the first curved mold surface 462 by using the flowable material 483 to push the optical film 440 onto the first curved mold surface 462. In some embodiments, the flowable material 483 has a temperature greater than a glass transition temperature of the optical film 440 when the flowable material 483 flows into the cavity 480. In some embodiments, the first and second molds 460 and 470 are held at a temperature below a melting point of the flowable material 483 in order to solidify the flowable material 483. In some embodiments, the temperature of the first and second molds 460 and 470 are also below the glass transition temperature of the optical film 440 when the flowable material 483 flows into the cavity 480. For example, the flowable material 483 may have a temperature in a range of 250 to 300° C. when it is introduced into the cavity 480, the first and second molds may have a temperature in a range of 75 to 100° C., and the optical film 440 may have a glass transition temperature in a range of 105 to 130° C. In some embodiments, the optical film 440 has multiple layers and the flowable material 483 has a temperature greater than a glass transition temperature of each layer of the optical film 440 when the flowable material 483 flows into the cavity 480. In some embodiments, the optical film 440 has multiple layers and the flowable material 483 has a temperature greater than a glass transition temperature of at least one layer of the optical film 440 when the flowable material 483 flows into the cavity 480. In some embodiments, the optical film 440 has multiple layers and the flowable material 483 has a temperature greater than a glass transition temperature of the layer of the optical film 440 immediately adjacent the flowable material 483 when the flowable material 483 flows into the cavity 480 and contacts the optical film 440.

The steps depicted in FIGS. 6A-6D can be carried out in other orders. For example, the optical film 440 can be conformed to the first curved mold surface 462 prior to introducing the flowable material 483 using air pressure, for example. Then the second mold 470 can then be provided and the flowable material 483 then introduced into the mold cavity 480.

In some embodiments, the first mold 460 is a first mold insert which is configured to be placed in a mold base. Similarly, in some embodiments, second mold 470 is a second mold insert which is configured to be placed in a mold base.

In some embodiments, the solid optical element 485 is permanently bonded to the optical film 440. In other embodiments, the solid optical element 485 is releasably bonded to the optical film 440. For example, a release coating may be applied to the optical film 440 prior to placing the optical film on the first mold surface 462. This can be done to allow the optical film 440 to be removed from the solid optical element 485 and placed on a surface of another optical element having a similar shape, for example.

The first curved mold surface 462 has a best-fit spherical first radius of curvature R which, in some embodiments, is in a range from about 30 mm to about 1000 mm. The first curved mold surface 462 has a sag S. In some embodiments, a ratio of the sag S to the best-fit spherical first radius of curvature R is in a range of about 0.02 to about 0.2, or in a range of about 0.02 to about 0.15, or in a range of about 0.02 to about 0.12, or in a range of about 0.03 to about 0.12, or in a range of about 0.04 to about 0.12. In some embodiment, the optical film 440 has a sag to radius ratio in any of these ranges after being formed into a curved shape. In some embodiments, the substantially flat optical film 440 is at least uniaxially stretch-oriented. In some embodiments, the substantially flat optical film 440 has an average thickness in a range from about 20 micrometers to about 100 micrometers.

In some embodiments, the optical film 440 is a reflective polarizer. In some embodiments, the reflective polarizer has an average optical transmittance greater than about 70% for a first polarization state and an average optical reflectance greater than about 70% for an orthogonal second polarization state. In some embodiments, the reflective polarizer, prior to being formed in the process depicted in FIGS. 6A-6D, is substantially uniaxially oriented in that it has a degree of uniaxial character U of at least 0.7, or at least 0.8, or at least 0.85, where $U=(1/MDDR-1)/(TDDR^{1/2}-1)$ with MDDR defined as the machine direction draw ratio and TDDR defined as the transverse direction draw ratio. Such substantially uniaxially oriented multilayer optical films are described in U.S. Pat. No. 2010/0254002 (Merrill et al.) and may include a plurality of alternating first and second polymeric layers with the first polymeric layers having indices of refraction in a length direction (e.g., x-direction) and a thickness direction (e.g., z-direction) that are substantially the same, but substantially different from an index of refraction in a width direction (e.g., y-direction). For example, the absolute value of the difference in the refractive indices in the x- and z-directions may be less than 0.02 or less than 0.01, and the absolute value of the difference in the refractive indices in the x- and y-directions may be greater than 0.05, or greater than 0.10. Except where specified differently, refractive index refers to the refractive index at a wavelength of 550 nm.

In some embodiments, the optical film 440 is stretched along a first axis (e.g., axis along the x- or y-direction of FIG. 6B). In some embodiments, the flowable material 483 flows into the mold cavity 480 through a gate 481 (FIG. 6B) connected to the mold cavity 480. In some embodiments, the flowable material 483 flows into the mold cavity 480 along the first axis (e.g., axis along the x-direction) or substantially along the first axis. In some embodiments, the flowable material 483 flows into the mold cavity 480 along a second direction (the x direction in the embodiment illustrated in FIG. 6C) that is substantially perpendicular to the first axis (e.g., axis along the y-direction). Substantially along a specified direction can be understood to mean along a direction that is within 40 degrees of the specified direction, and substantially perpendicular can be understood to mean within 40 degrees of perpendicular. In some embodiments, a direction described as substantially along a first axis is with 30 degrees, or with 20 degrees of the first axis. In some embodiments, a direction described as substantially perpendicular to a first axis is within 30 degrees, or with 20 degrees of perpendicular to the first axis.

In some embodiments, a reflective polarizer is formed on an optical lens using the processes described herein to form an optical assembly that is used in an optical system of the present description. In some embodiments, the optical assembly provides a reduced spatial variation in one or more of the maximum transmittance, the band edge wavelength, the pass axis orientation, and the thickness of the reflective polarizer compared to optical assemblies made using conventional methods of forming a film into a curved shape.

Figure 7:
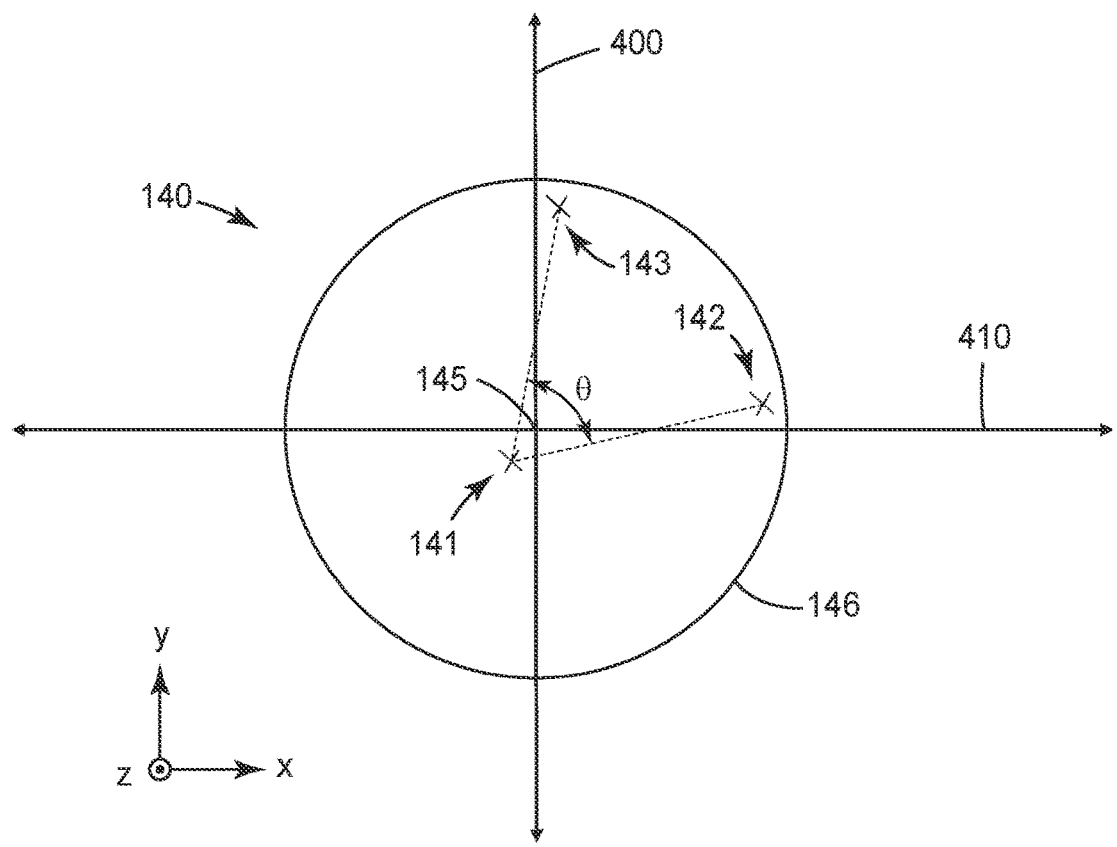
FIG. 7 is a schematic front view of a reflective polarizer.

FIG. 7 is a schematic front view of a reflective polarizer 140, which may correspond to reflective polarizer 40, for example. The transmittance variation and/or the band edge wavelength variation may be described by referring to at least one first, second and third locations of the reflective polarizer 140 where the at least one first location is near a center 145 of the reflective polarizer, the at least one second and third locations are near an edge 146 of the reflective polarizer, and the at least one second location and the at least one third location subtending an angle in a range from about 30 degrees to about 110 degrees at the at least one first location. A location may be described as near a center or edge if it is within about 30 percent of a largest lateral dimension of the reflective polarizer 140 from the center or edge, respectively. A location described as near a center or edge may be within about 25 percent, or about 20 percent, of a largest lateral dimension of the reflective polarizer 140 from the center or edge, respectively.

First location 141, second location 142 and third location 143 are shown in FIG. 7. The second and third locations 142 and 143 subtend an angle θ at the first location 141. In some embodiments, the angle θ is in a range from about 30 degrees to about 110 degrees, or in a range of about 40 to about 100 degrees. In the illustrated embodiment, second location 142 is closer to axis 410, which may be a block axis of the reflective polarizer, for example, and third location 143 is closer to orthogonal axis 400, which may be a pass axis of the reflective polarizer, for example.

In some embodiments, for normally incident light having a wavelength in the predetermined wavelength range, each location on the reflective polarizer 140 having a maximum reflectance greater than about 70% for a first polarization state, a maximum transmittance greater than about 70% for an orthogonal second polarization state, and a minimum transmittance for the first polarization state, such that the maximum transmittances of at least one first (e.g., first location 141), second (e.g., second location 142) and third (e.g., third location 143) locations, the at least one first location near a center 145 of the reflective polarizer 140 and the at least one second and third locations near an edge 146 of the reflective polarizer 140, are within about 1%, or within about 0.5% of each other, the at least one second location and the at least one third location subtending an angle (e.g., the angle θ) in a range from about 30 degrees to about 110 degrees at the at least one first location.

Multilayer polymeric reflective polarizer films formed using the processes described elsewhere herein onto a surface 21 of a lens 20 described by Formula 1 with k about 4.9, c about $1/120$ mm$^4$, D about zero, E about 2.5E-06 mm$^{-3}$, and F and higher order terms about zero were found to have a linear diattenuation having a standard deviation of less than about 0.5%. Linear diattenuation is given by $(T_{Max}-T_{Min})/(T_{Max}+T_{Min})$ where $T_{Max}$ is the transmittance of light linearly polarized along a direction which maximizes transmittance and $T_{Min}$ is the transmittance of light linearly polarized along a direction which minimizes transmittance. Another parameter that may be used to characterize an optical assembly including a reflective polarizer disposed on an optical lens, for example, is the circular diattenuation which is given by $(T_R-T_L)/(T_R+T_L)$ where $T_R$ is the transmittance of right circularly polarized light and $T_L$ is the transmittance of left circularly polarized light. Linear diattenuation and circular diattenuation of a reflective polarizer or an optical assembly including a lens and a reflective polarizer can be measured using a polarimeter in transmission mode. A suitable polarimeter is the AxoScan™ Mueller Matrix Polarimeter available from Axometrics, Inc. (Huntsville, Ala.). The polarimeter can include a polarizer and an analyzer. The polarimeter may be a dual rotating retarder polarimeter.

In some embodiments, for normally incident light, each location on the reflective polarizer having a corresponding reflection band having a band edge wavelength, such that the band edge wavelengths of at least one first (e.g., first location 141), second (e.g., second location 142) and third (e.g., third location 143) locations, the at least one first location near a center 145 of the reflective polarizer 140 and the at least one second and third locations near an edge 146 of the reflective polarizer 140, are within 3%, or within 2%, or within 1% of each other, the at least one second location and the at least one third location subtending an angle (e.g., the angle θ) in a range from about 30 degrees to about 110 degrees at the at least one first location.

The band edge wavelength is expected to vary with the thickness variation of the film. A multilayer polymeric reflective polarizer formed using the processes described elsewhere herein onto a surface 21 of a lens 20 described by Formula 1 with k about 4.9, c about $\frac{1}{120}$ mm$^{-1}$, D about zero, E about 2.5E-06 mm$^{-3}$, and F and higher order terms about zero was found to have a thickness at first second and third locations within about 1% of each other. In one example, a reflective polarizer had a thickness of 65.7 micrometers at the apex of the lens and a thickness of about 66.1 micrometers at a location near the edge of the lens and a thickness of about 65.8 micrometers at another location near the edge of the lens. The minimum thickness was 64.8 micrometers and the maximum thickness was 66.1 micrometers.

Figure 8:
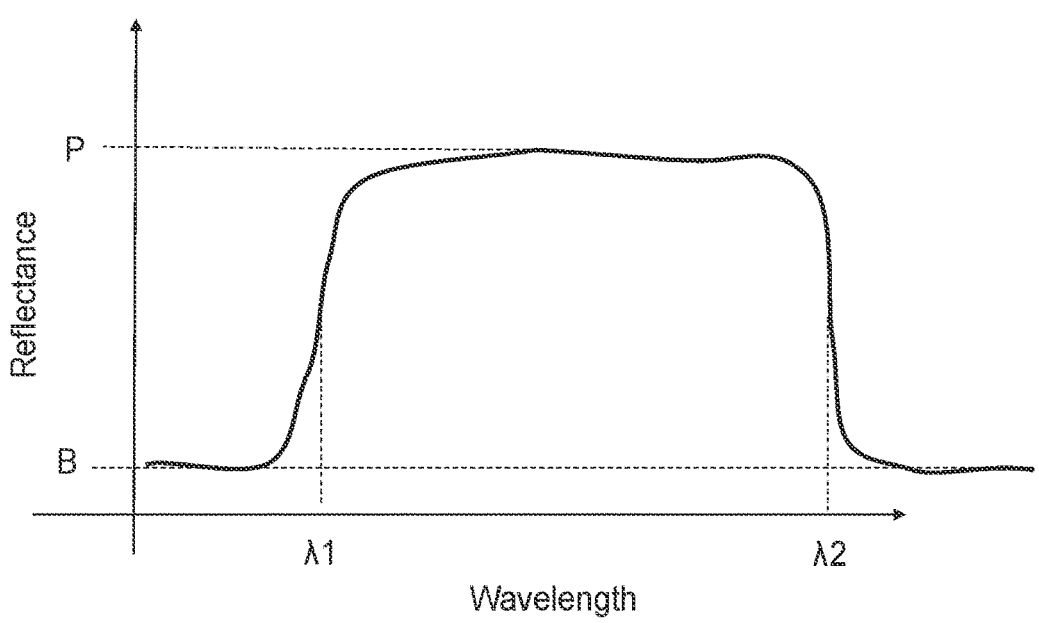
FIG. 8 is a schematic plot of a reflection band.

FIG. 8 schematically illustrates a reflection band having band edge wavelength λ1 and λ2. As described in US 2015/0146166 (Weber et al.), each band edge wavelength can be identified as the wavelength where the reflectivity drops to a value halfway between a maximum reflectance (P) in the reflection band and a baseline reflectance (B) outside of the reflection band. In the illustrated embodiment, the reflectance at the wavelength λ1 and the reflectance at the wavelength λ2 is (B+P)/2. When comparing band edge wavelengths at different locations, it the same band edge (lower or upper wavelength band edge λ1 or λ2) that should be compared at the different locations.

Figure 9A:
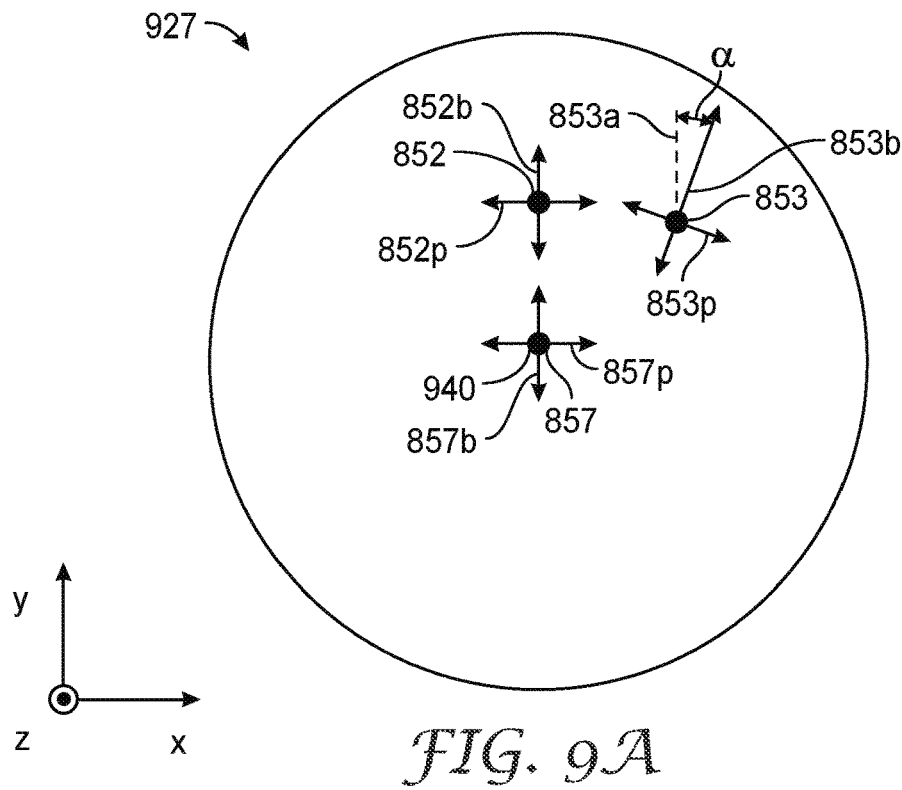
FIGS. 9A-9B are schematic front views of a reflective polarizer.
Figure 9B:
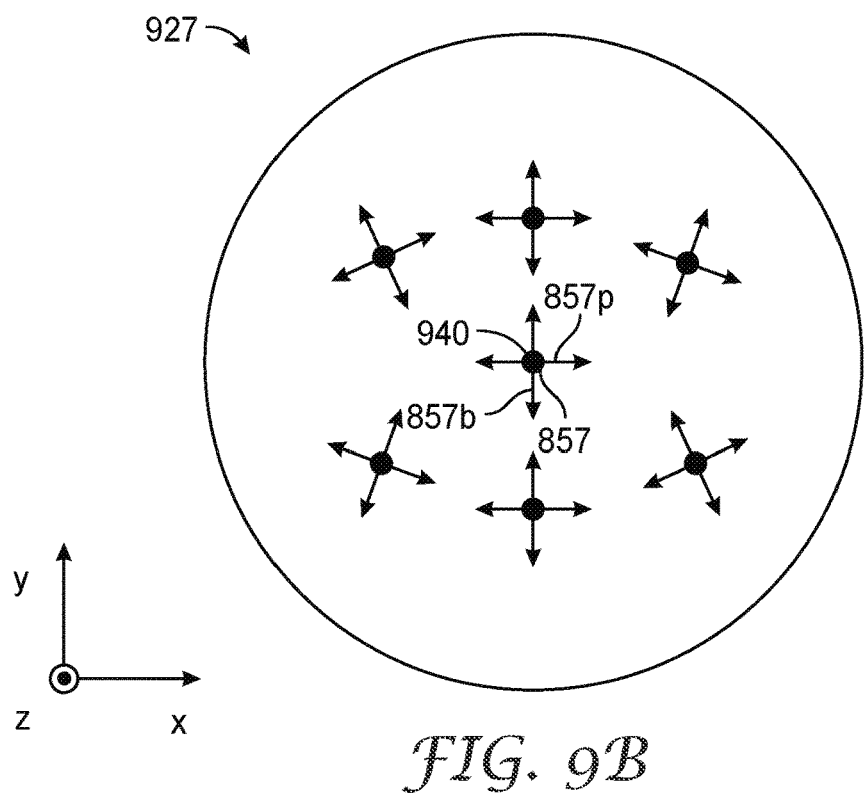
Figure 9C:
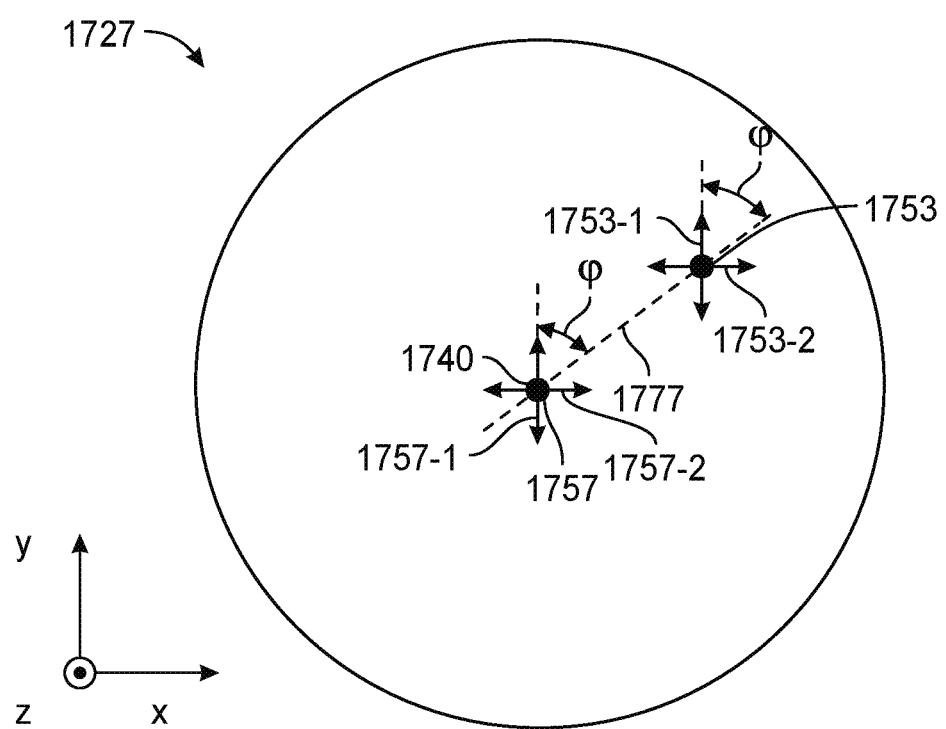
FIG. 9C is a schematic front view of a curved surface.

FIG. 9A is a schematic front view of reflective polarizer 927 having an origin or apex 857 along an optical axis 940. The reflective polarizer 927 is curved about two orthogonal axes (e.g., the x- and y-axes). FIG. 9B is a schematic front view of the reflective polarizer 927 schematically illustrating a possible spatial variation in the orientation of the pass and block axes. The reflective polarizer 927 has orthogonal pass and block axes 857p and 857b at the apex 857. The reflective polarizer 927 has orthogonal pass and block axes 852p and 852b at a first location 852, and orthogonal pass and block axes 853p and 853b at a second location 853. In the illustrated embodiment, the pass and block axes 852p and 852b are substantially aligned with the pass and block axes 857p and 857b, while the pass and block axes 853p and 853b are rotated by an angle α relative to axes aligned with the pass and block axes 857p and 857b. Axes tangent to a curved surface at different locations on the curved surface may be said to be aligned with each other if a corresponding angle between the axes and a tangent to a shortest smooth curve on the curved surface between the two locations are the same. This is schematically illustrated in FIG. 9C which is a front plan view of a curved surface 1727 illustrating first and second axes 1757-1 and 1757-2 at a first location 1757 and first and second axes 1753-1 and 1753-2 at a second location 1753. The first and second axes 1757-1 and 1757-2 are tangent to the surface 1727 at the first location 1757 and the first and second axes 1753-1 and 1753-2 are tangent to the surface 1727 at the second location 1753. Since the surface 1727 is curved, the first and second axes 1753-1 and 1753-2 are generally in a different plane than the first and second axes 1757-1 and 1757-2. A shortest curve 1777 is shown between the first and second locations 1757 and 1753. The shortest curve 1777 is illustrated as being linear in plan view, but in other cases the curve 1777 may be nonlinear in pan view. An angle φ is shown between the first axis 1757-1 and the curve 1777 at the first location 1757. The corresponding angle between the first axis 1753-1 and the curve 1777 is also φ so that the first axis 1757-1 and the first axis 1753-1 are aligned. Similarly, an angle between the second axis 1757-2 and the curve 1777 at the first location 1757 is equal to the corresponding angle between the second axis 1753-2 and the curve 1777 at the second location 1753 (90 degrees minus φ) so the second axis 1757-2 and the second axis 1753-2 are aligned. The first location 1757 is at an origin 1740 of the curved surface which may be a centroid of the surface and/or an apex and/or a location intersected by an optical axis of an optical system including the curved surface 1727. Axes aligned with the first and second axes 1757-1 and 1757-2 can be defined at each point on the surface 1727 by orienting the axes such that they make the same corresponding angle with respect to a shortest curve between the point and the first location as the first and second axes 1757-1 and 1757-2. The local pass and block axes at each point on a reflective polarizer may be specified relative to axes tangent to the reflective polarizer that are aligned with axes defined at the optical axis (e.g., axes 857b and/or 857p). For example, axis 853a at location 853 is aligned with block axis 857b since axis 853a and 857b are both tangent to the reflective polarizer 927 and have a same angle with respect to a shortest curve between the locations 857 and 853.

In some embodiments, prior to forming a reflective polarizer into a curved shape, the reflective polarizer has a maximum variation of an orientation of the pass polarization state of about θ1 and after forming has a maximum variation of an orientation of the pass polarization state of about θ2. For example, in the embodiment illustrated in FIG. 9A, the orientation of the pass polarization state is rotated by an angle α relative to axes aligned with the pass and block axes 857p and 857b. In this case, the maximum minus the minimum of the angle α over the reflective polarizer is θ1 prior to forming and is θ2 after forming. In some embodiments, θ1 and θ2 are within about 5 degrees, or within about 4 degrees, or within about 3 degrees, or within about 2 degrees, or within about 1 degree of each other. In some embodiments, θ1 is no more than about 0.5 degrees or no more than about 0.3 degrees, and θ2 is no more than about 1 degree, or no more than about 0.8 degrees, or no more than about 0.6 degrees. In some embodiments, θ1 is about 0.5 degrees and θ2 is about 1 degree. In some embodiments, θ1 is about 0.3 degrees and θ2 is about 0.5 degrees. In some embodiments, θ1 is between about 0.2 degrees and about 0.3 degrees, and θ2 is between about 0.4 degrees and about 1 degree. For example, multilayer polymeric reflective polarizer films formed using the processes described elsewhere herein onto a surface 21 of a lens 20 described by Formula 1 with k about 4.9, c about $\frac{1}{120}$ mm$^{-1}$, D about zero, E about 2.5E-06 mm$^{-3}$, and F and higher order terms about zero were found to have a θ2 between about 0.4 degrees and about 1 degree, when the films prior to forming had a θ1 between about 0.2 degrees and about 0.3 degrees.

Figure 10A:
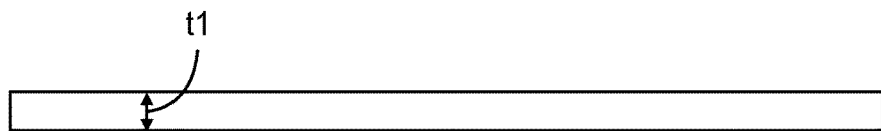
FIG. 10A is a schematic cross-sectional view of a reflective polarizer prior to forming the reflective polarizer into a curved shape.
Figure 10B:
FIG. 10B is a schematic cross-sectional view of the reflective polarizer of FIG. 10A after forming the reflective polarizer into a curved shape.

FIG. 10A is a schematic cross-sectional view of an optical film 341 prior to forming and FIG. 10B is a schematic cross-sectional view of the optical film 341 after forming into a curved shape. Prior to forming, the optical film 341 has a thickness t1 which may be substantially constant or which may vary over film. After forming, the optical film has a thickness t2 which may be substantially constant or which may vary over the film. Prior to forming, the optical film 341 has a first maximum thickness variation (maximum t1 minus minimum t1) and after forming, the optical film 341 has a second maximum thickness variation (maximum t2 minus minimum t2). In some embodiments, the first and second maximum thickness variations are within 5%, or within 4%, or within 3%, or within 2%, or within 1% of each other. In some embodiments, the first maximum thickness variation is less than 4%, or less than 3%, or less than 2%, or less than 1% of a mean thickness of the optical film 341 prior to forming. In some embodiments, the second maximum thickness variation is less than 5%, or less than 4%, or less than 3%, or less than 2% of a mean thickness of the optical film 341 after forming. For example, a multilayer polymeric reflective polarizer formed using the processes described elsewhere herein onto a surface 21 of a lens 20 described by Formula 1 with k about 4.9, c about $\frac{1}{120}$ mm$^{-3}$-, D about zero, E about 2.5E-06 mm$^3$, and F and higher order terms about zero was found to have a thickness within about 2% of a mean thickness across the reflective polarizer.

In some embodiments, one or more of the maximum transmittance variation across the reflective polarizer, the variation orientation of the pass polarization state across the reflective polarizer, the thickness variation across the reflective polarizer, the variation of the band edge wavelength of the reflective polarizer depends on the sag to diameter ratio of the formed reflective polarizer. In some embodiments, a larger sag to diameter ratio results in a larger variation and a smaller sag to diameter ratio results in a smaller variation. In some embodiments, the sag to diameter ratio is greater than about 0.01, or greater than about 0.02. In some embodiments, the sag to diameter ratio is less than about 0.1, or less than about 0.08.

Figure 11:
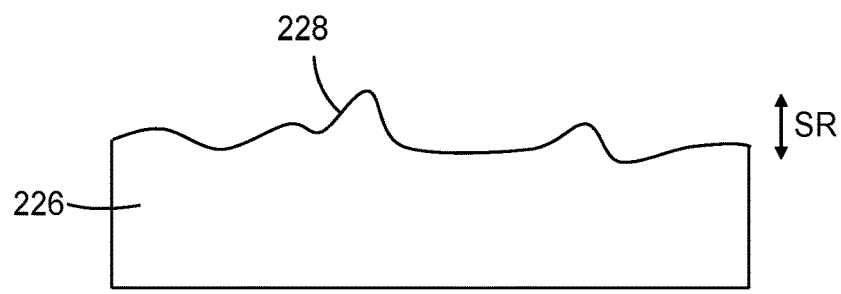
FIG. 11 is a schematic cross-sectional view of a portion of an element illustrating an average surface roughness SR.

FIG. 11 is a schematic cross-sectional view or a portion of an element 226 having a surface 228 with an average surface roughness SR. Element 226 may be a mold or an optical film (e.g., reflective polarizer), for example. It will be understood that element 226 may be curved even though the curvature may not be visible on the scale of the figure. The average surface roughness can be defined as the average of the absolute value of the deviation of the surface height from a mean height and may be denoted Ra. The height and mean height can be determined relative to a smooth reference surface through a center of the reflective polarizer in the thickness direction. The reference surface may be curved (e.g., the reference surface may be parallel to a major surface of a lens when the reflective polarizer is disposed on and conforms to the major surface). In some embodiments, the processes for forming an optical film into a curved shape can result in formed optical film having a surface roughness different from that of the corresponding mold surface. According to some embodiments, it has been found the resulting optical film has a greater surface roughness than the corresponding mold surface.

Referring again to FIGS. 6A-6D, optical film 440 has a first major surface facing the first mold surface 462 of the first mold 460 and an opposing second major surface facing the second mold surface 472 of the second mold 470. In some embodiments, the first mold surface 462 has a first average surface roughness, and the first major surface of the optical film 440 in the resulting optical assembly 490 has a second average surface roughness. In some embodiments, the second average surface roughness is greater than the first average surface roughness. In some embodiments, the first average surface roughness is about 0.05 micrometers and the second average surface roughness is about 0.1 micrometers. In some embodiments, the optical film 440 prior to forming is a substantially flat reflective polarizer having an average optical transmittance greater than about 70% for a first polarization state and an average optical reflectance greater than about 70% for an orthogonal second polarization state. In some embodiments, after forming, the reflective polarizer is bonded to a solid optical element and the first major surface of the reflective polarizer has a second average surface greater than the first average surface roughness.

In some embodiments, the first mold surface 462 has an irregular surface as illustrated in FIG. 11 for element 226. In some embodiments, the first mold surface 462 has a regular pattern which results in an outermost surface of an optical film having a regular pattern formed therein. This is schematically illustrated in FIG. 12.

Figure 12:
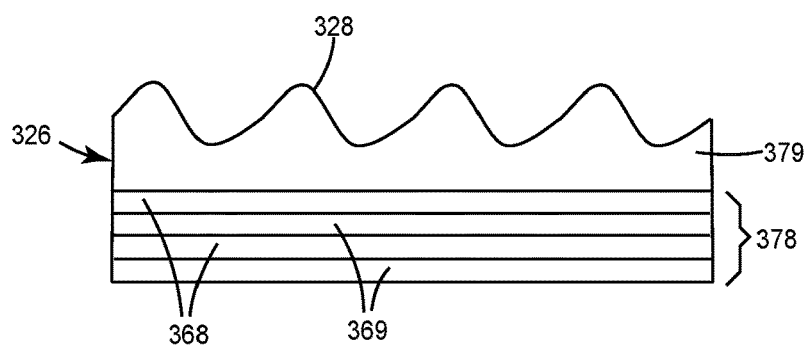
FIG. 12 is a schematic cross-sectional view of a portion of a unitary multilayer optical film.

FIG. 12 is a schematic cross-sectional view of multilayer optical film 326 including a plurality of interference layers 378 and an outermost noninterference layer 379. It will be understood that the multilayer optical film 326 may be curved even though the curvature may not be visible on the scale of the figure. The plurality of interference layers 378 includes alternating first and second layers 368 and 369. As is known in the art, a plurality of interference layers can be used in a mirror film or a reflective polarizer, for example, to selectively reflect or transmit light based by constructive or destructive interference of light reflected at the interfaces between the layers. The interference layers are typically arranged so that a pair of immediately adjacent layers have a total optical thickness of ½ of a predetermined wavelength. Noninterference layers typically have a thickness larger that the predetermined wavelength. For example, the predetermined wavelength may be a visible wavelength, and the noninterference layer may have an average thickness greater than about 1 micrometer.

In some embodiments, the multilayer optical film 326 is a unitary construction. A multilayer film is a unitary construction if it is integrally formed so that elements are not formed separately and then adhered together. For example, multilayer optical film 326 can be made by co-extruding each layer in the multilayer optical film 326. The film can then be stretched uniaxially or biaxially, for example, in order to orient layers in the plurality of interference layers 378. The film can then be molded using a process described elsewhere herein. The outermost noninterference layer 379 has an outermost surface 328.

In some embodiments, outermost surface 328 has a regular pattern formed therein. For example, the regular pattern be a periodic pattern.

In the illustrated embodiment, four layers are shown for the plurality of interference layers 378. In some embodiments, the plurality of interference layers 378 includes many more layers. For example, a multilayer optical film may have a plurality of interference layers including 40 to 800 layers. In the illustrated embodiment, only one outermost noninterference layer 379 is illustrated. In some embodiments, the multilayer optical film 326 includes a second outermost noninterference layer opposite the outermost noninterference layer 379. The outermost noninterference layer 379 and the opposing second outermost noninterference layer may be integrally formed with the multilayer optical film 326 in a co-extrusion process. The second outermost noninterference layer may have an unpatterened outer surface. In some embodiments, the multilayer optical film 326 is formed into a curved shape using a method described elsewhere herein and the pattern in the outermost surface 328 is formed due to a pattern present in the first curved mold surface 462 of the first mold 460. The first curved mold surface 462 may be patterned due to the forming of the mold (e.g., via diamond turning).

Figure 13:
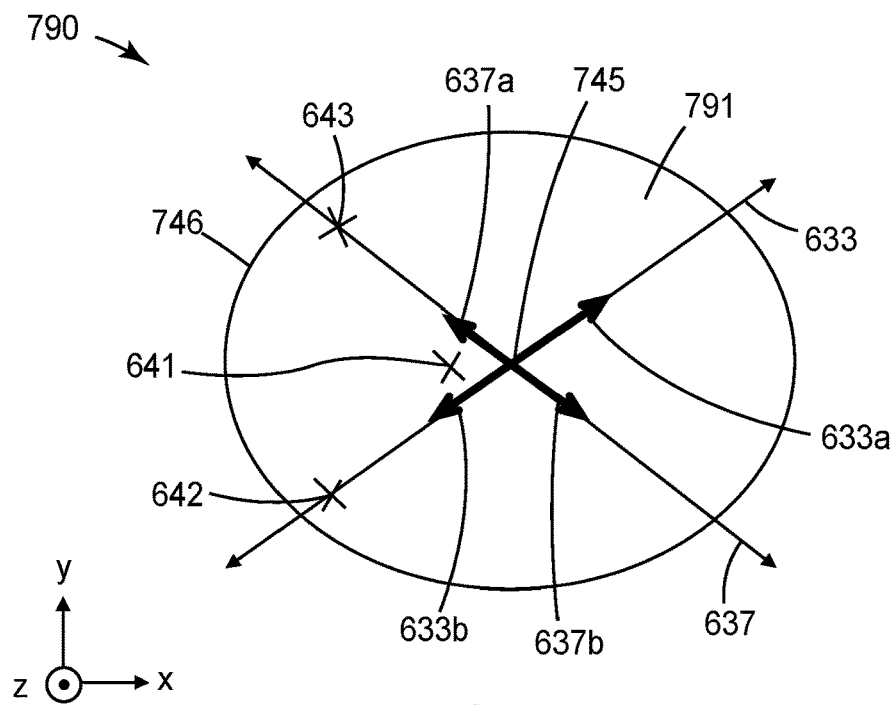
FIG. 13 is a schematic top plan view of an optical assembly.

It has been found that optical assemblies formed using the methods described elsewhere herein have, in some embodiments, a circular diattenuation with a smaller magnitude at a first location near a center of the optical assembly and positive with a larger magnitude at a second location near an edge of the optical assembly and negative with the larger magnitude near a third location near an edge of the optical assembly. In some embodiments, an optical assembly includes an optical lens having a first major surface and an optical birefringence of at least about 15 nm/cm, or at least about 20 nm/cm; and a reflective polarizer disposed on and conforming to the first major surface. FIG. 13 is a schematic top plan view of an optical assembly 490 having a reflective polarizer 791 facing up (in the positive z-direction). In some embodiments, the optical assembly 490 has a circular diattenuation such that in a top plan view, the circular diattenuation increases from a center 745 of the reflective polarizer 791 to an edge of the reflective polarizer 746 in each of two opposite directions 633a and 633b along a first axis 633 and decreases from the center 745 of the reflective polarizer 791 to the edge 746 of the reflective polarizer 791 in each of two opposite directions 637a and 637h along a different second axis 637. In some embodiments, the first and second axes 633 and 637 are substantially perpendicular to each other. In some embodiments, an angle between the first and second axes 633 and 637 is between 70 and 110 degrees. In some embodiments, the circular diattenuation is between about −0.01 and about 0.01 at a first location 641 near the center 745 of the reflective polarizer 791 and is greater than about 0.02 at a second location 642 along the first axis 633 near the edge 746 of the reflective polarizer 791 and is less than about −0.02 at a third location 643 along the second axis 637 near the edge of the reflective polarizer 791. In some embodiments, the circular diattenuation is between about −0.1 and about 0.1 at the first location 641 near the center 745 of the reflective polarizer 791 and is greater than about 0.2 at the second location 642 along the first axis 633 near the edge 746 of the reflective polarizer 791 and is less than about −0.2 at the third location 643 along the second axis 637 near the edge of the reflective polarizer 791. In some embodiments, a magnitude of the circular diattenuation at the second location 742 is within 10 percent of a magnitude of the circular diattenuation at the third location 743.

In some embodiments, the circular diattenuation is determined using a light source facing the reflective polarizer and in some embodiments, the circular diattenuation is determined using a light source facing the optical lens. The light source may be provided by a polarimeter configured to measure the circular diattenuation in transmission mode. According to some embodiments, the circular diattenuation has a larger magnitude when determined with the light source facing the lens and a lower magnitude when determined with the light source facing the reflective polarizer. In some embodiments, the circular diattenuation is determined using light incident on the optical assembly parallel to an optical axis of the optical assembly. In the illustrated embodiment, the optical assembly 790 has an optical axis through the center 745 parallel to the z-axis.

Figure 14:
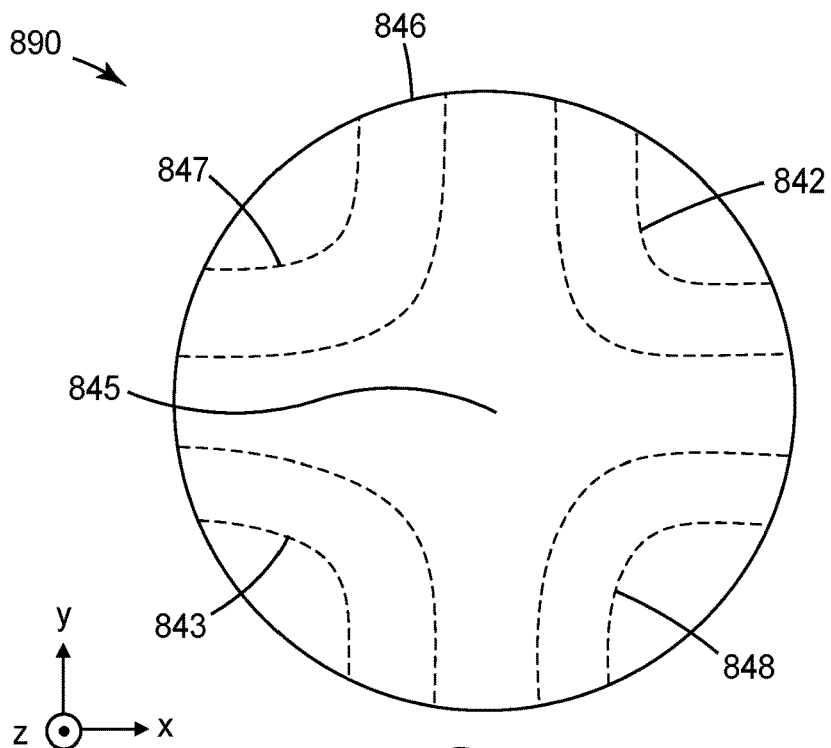
FIG. 14 is a schematic contour plot of the circular diattenuation of an optical assembly.

FIG. 14 is a schematic contour plot of the circular diattenuation of an optical assembly 890 including a reflective polarizer disposed on a curved surface of an optical lens. The circular diattenuation can be measured using a polarimeter in transmission mode with incident light parallel to z-axis. The reflective polarizer has a center 845 and an edge 846. In some embodiments, the circular diattenuation at the center 845 has a magnitude less than about 0.1 or less than about 0.01. In some embodiments, the circular diattenuation on the contours 842 and 843 are greater than about 0.02 or greater than about 0.2. In some embodiments, the circular diattenuation on the contours 847 and 848 are less than about negative 0.02 or less than about negative 0.2.

The following is a list of exemplary embodiments of the present description.

Embodiment 1 is an optical system for displaying an image to a viewer comprising:
a first optical lens comprising an optical birefringence less than about 15 nm/cm, a curved first major surface having a best-fit spherical first radius of curvature in a range from about 20 mm to about 200 mm, and an opposing second major surface having a best-fit spherical second radius of curvature greater than about 500 mm, the curved first major surface concave toward the second major surface;
a second optical lens comprising an optical birefringence greater than about 15 nm/cm, a curved first major surface facing and convex toward the second major surface of the first optical lens and having a best-fit spherical first radius of curvature in a range from about 14 mm to about 250 mm, and an opposing second major surface having a best-fit spherical second radius of curvature greater than about 125 mm; a partial reflector disposed on and conforming to the first curved major surface of the first optical lens and having an average optical reflectance of at least 30% in a predetermined wavelength range;
a reflective polarizer disposed on and conforming to the curved first major surface of the second optical lens, the reflective polarizer substantially reflecting light having a first polarization state and substantially transmitting light having an orthogonal second polarization state in the predetermined wavelength range; and
a first retarder layer disposed on and conforming to the second major surface of the first optical lens.

Embodiment 2 is the optical system of Embodiment 1, wherein the curved first major surface of the first optical lens has a best-fit spherical first radius of curvature in a range from about 20 mm to about 150 mm.

Embodiment 3 is the optical system of Embodiment 1, wherein the curved first major surface of the first optical lens has a best-fit spherical first radius of curvature in a range from about 25 mm to about 100 mm.

Embodiment 4 is the optical system of Embodiment 1, wherein the curved first major surface of the first optical lens has a best-fit spherical first radius of curvature in a range from about 30 mm to about 60 mm.

Embodiment 5 is the optical system of Embodiment 1, wherein the curved first major surface of the first optical lens is an aspherical surface.

Embodiment 6 is the optical system of Embodiment 5, wherein the aspherical first major surface of the first optical lens is described by a formula:

$$z = \frac{cr^2}{1 + [1 - (1+k)c^2 r^2]^{1/2}} + Dr^2 + Er^4 + Fr^6 + Gr^8 + Hr^{10} + Ir^{12} + Jr^{14}$$

where r is a distance from an optical axis of the optical system to the aspherical surface, c is a curvature coefficient, k is a conic constant and D, E, F, G, H, I and J are correction coefficients of the aspherical surface.

Embodiment 7 is the optical system of Embodiment 6, wherein k is in a range from about 3 to 7.

Embodiment 8 is the optical system of Embodiment 6, wherein a radius of curvature of the vertex of the aspherical surface is in a range from about 40 mm to 50 mm.

Embodiment 9 is the optical system of Embodiment 6, wherein k is about 4.6, c is about 1/44.9 mm$^{-1}$, D is about zero, E is about −1.3E-06, F is about 6E-09 and G is about −1.6E-12.

Embodiment 10 is the optical system of Embodiment 1, wherein the curved first major surface of the first optical lens is a spherical surface.

Embodiment 11 is the optical system of Embodiment 1, wherein the second major surface of the first optical lens has a best-fit spherical second radius of curvature greater than about 750 mm.

Embodiment 12 is the optical system of Embodiment 1, wherein the second major surface of the first optical lens has a best-fit spherical second radius of curvature greater than about 1000 mm.

Embodiment 13 is the optical system of Embodiment 1, wherein the second major surface of the first optical lens is substantially flat.

Embodiment 14 is the optical system of Embodiment 1, wherein the curved first major surface of the second optical lens has a best-fit spherical first radius of curvature in a range from about 50 mm to about 200 mm.

Embodiment 15 is the optical system of Embodiment 1, wherein the curved first major surface of the second optical lens has a best-fit spherical first radius of curvature in a range from about 75 mm to about 200 mm.

Embodiment 16 is the optical system of Embodiment 1, wherein the curved first major surface of the second optical lens has a best-fit spherical first radius of curvature in a range from about 100 mm to about 150 mm.

Embodiment 17 is the optical system of Embodiment 1, wherein the curved first major surface of the second optical lens has a best-fit spherical first radius of curvature in a range from about 110 mm to about 140 mm.

Embodiment 18 is the optical system of Embodiment 1, wherein the curved first major surface of the second optical lens is an aspherical surface.

Embodiment 19 is the optical system of Embodiment 18, wherein the aspherical first major surface of the second optical lens is described by a formula:

$$z = \frac{cr^2}{1+[1-(1+k)c^2r^2]^{1/2}} + Dr^2 + Er^4 + Fr^6 + Gr^8 + Hr^{10} + Ir^{12} + Jr^{14}$$

where r is a distance from an optical axis of the optical system to the aspherical surface, c is a curvature coefficient, k is a conic constant and D, E, F, G, H, I and J are correction coefficients of the aspherical surface.

Embodiment 20 is the optical system of Embodiment 19, wherein k is in a range from about 3 to 7.

Embodiment 21 is the optical system of Embodiment 19, wherein a radius of curvature of the vertex of the aspherical surface is in a range from about 100 mm to 140 mm.

Embodiment 22 is the optical system of Embodiment 19, wherein k is about 4.9, c is about 1/120 mm$^{-1}$, D is about zero, E is about 2.5E-06, F is about zero and G is about zero.

Embodiment 23 is the optical system of Embodiment 1, wherein the second major surface of the second optical lens has a best-fit spherical second radius of curvature greater than about 500 mm.

Embodiment 24 is the optical system of Embodiment 1, wherein the second major surface of the second optical lens has a best-fit spherical second radius of curvature less than about 1000 mm.

Embodiment 25 is the optical system of Embodiment 1, wherein the second major surface of the second optical lens has a best-fit spherical second radius of curvature in a range from about 200 mm to about 800 mm.

Embodiment 26 is the optical system of Embodiment 1, wherein the second major surface of the second optical lens is substantially flat.

Embodiment 27 is the optical system of Embodiment 1, wherein the second major surface of the second optical lens is convex toward the curved first major surface of the second optical lens.

Embodiment 28 is the optical system of Embodiment 1, wherein the second major surface of the second optical lens is concave toward the curved first major surface of the second optical lens.

Embodiment 29 is the optical system of Embodiment 1, wherein the second major surface of the second optical lens is an aspherical surface.

Embodiment 30 is the optical system of Embodiment 29, wherein the aspherical second major surface of the second optical lens is described by a formula:

$$z = \frac{cr^2}{1+[1-(1+k)c^2r^2]^{1/2}} + Dr^2 + Er^4 + Fr^6 + Gr^8 + Hr^{10} + Ir^{12} + Jr^{14}$$

where r is a distance from an optical axis of the optical system to the aspherical surface, c is a curvature coefficient, k is a conic constant and D, E, F, G, H, I and J are correction coefficients of the aspherical surface.

Embodiment 31 is the optical system of Embodiment 30, wherein k is in a range from about 3 to 7.

Embodiment 32 is the optical system of Embodiment 30, wherein a radius of curvature of the vertex of the aspherical surface is in a range from about 210 mm to 250 mm.

Embodiment 33 is the optical system of Embodiment 30, wherein k is about 4.9, c is about 1/231 mm$^{-1}$, D is about zero, E is about −1.4E-05, F is about 2.1E-08 and G is about −9.3E-11.

Embodiment 34 is the optical system of Embodiment 1, wherein a first portion of the second major surface of the second optical lens is convex toward the curved first major surface of the second optical lens, and another second portion of the second major surface of the second optical lens is concave toward the curved first major surface of the second optical lens.

Embodiment 35 is the optical system of Embodiment 1, wherein the second major surface of the second optical lens is convex toward the curved first major surface of the second optical lens and has a best-fit spherical second radius of curvature greater than about 500 mm.

Embodiment 36 is the optical system of Embodiment 1, wherein the second major surface of the second optical lens is concave toward the curved first major surface of the second optical lens and has a best-fit spherical second radius of curvature greater than about 500 mm.

Embodiment 37 is the optical system of any one of Embodiments 1 to 36 having an optical axis, a light ray propagating along the optical axis passing through the first and second optical lenses, the partial reflector, the reflective polarizer, and the first retarder layer without being substantially refracted, such that for for a cone of light incident on the optical system from an object comprising a spatial frequency of about 40 line pairs per millimeter filling the exit pupil with a chief ray of the cone of light passing through a center of the opening of the exit pupil and making an angle of about 22.5 degrees with the optical axis, a modulation transfer function (MTF) of the optical system is greater than about 0.2.

Embodiment 38 is the optical system of any one of Embodiments 1 to 36 having an optical axis, a light ray propagating along the optical axis passing through the first and second optical lenses, the partial reflector, the reflective polarizer, and the first retarder layer without being substantially refracted, a cone of light incident on the optical system from an object comprising a spatial frequency of about 40 line pairs per millimeter filling the exit pupil with a chief ray of the cone of light passing through a center of the opening of the exit pupil and making an angle θ with the optical axis, such that for at least one larger θ and at least one smaller θ, each greater than about 5 degrees, the optical system has a smaller modulation transfer function (MTF) for the larger θ and a larger MTF for a smaller θ.

Embodiment 39 is the optical system of any one of Embodiments 1 to 36, wherein for normally incident light having a wavelength in the predetermined wavelength range, maximum transmittances of at least one first, second and third locations, the at least one first location near a center of the reflective polarizer and the at least one second and third locations near an edge of the reflective polarizer, are within 1% of each other, the at least one second location and the at least one third location subtending an angle in a range from about 30 degrees to about 110 degrees at the at least one first location.

Embodiment 40 is the optical system of any one of Embodiments 1 to 36, wherein band edge wavelengths of at least one first, second and third locations, the at least one first location near a center of the reflective polarizer and the at least one second and third locations near an edge of the reflective polarizer, are within 2% of each other, the at least one second location and the at least one third location subtending an angle in a range from about 30 degrees to about 110 degrees at the at least one first location.

Embodiment 41 is an optical system for displaying an image to a viewer, comprising:
spaced apart first and second optical lenses, no optical lenses disposed between the first and second optical lenses, the first optical lens comprising a glass and the second optical lens comprising a plastic, each of the first and second optical lenses comprising opposing first and second major surfaces, a ratio of radii of curvature of best-fit spheres to the first and second major surfaces of the first optical lens greater than about 5, a ratio of radii of curvature of best-fit spheres to the first and second major surfaces of the second optical lens in a range from about 1.5 to 10;
a partial reflector disposed on and conforming to a major surface of the first optical lens and having an average optical reflectance of at least 30% in a predetermined wavelength range;
a reflective polarizer disposed on and conforming to a major surface of the second optical lens, the reflective polarizer substantially reflecting light having a first polarization state and substantially transmitting light having an orthogonal second polarization state in the predetermined wavelength range;
a first retarder layer disposed between the reflective polarizer and the partial reflector; and
an exit pupil defining an opening therein,
the optical system having an optical axis, a light ray propagating along the optical axis passing through the first and second optical lenses, the partial reflector, the reflective polarizer, and the first retarder layer without being substantially refracted, such that for a cone of light incident on the optical system from an object comprising a spatial frequency of about 40 line pairs per millimeter filling the exit pupil with a chief ray of the cone of light passing through a center of the opening of the exit pupil and making an angle of about 22.5 degrees with the optical axis, a modulation transfer function (MTF) of the optical system is greater than about 0.2.

Embodiment 42 is the optical system of Embodiment 41 wherein for cones of light incident on the optical system from an object comprising a spatial frequency of about 40 line pairs per millimeter filling the exit pupil with a chief ray of the cone of light passing through a center of the opening of the exit pupil and making an angle θ with the optical axis, for at least one larger θ and at least one smaller θ, each greater than about 5 degrees, the optical system has a smaller modulation transfer function (MTF) for the larger θ and a larger MTF for a smaller θ.

Embodiment 43 is the optical system of Embodiment 41, wherein for normally incident light having a wavelength in the predetermined wavelength range, maximum transmittances of at least one first, second and third locations, the at least one first location near a center of the reflective polarizer and the at least one second and third locations near an edge of the reflective polarizer, are within 1% of each other, the at least one second location and the at least one third location subtending an angle in a range from about 30 degrees to about 110 degrees at the at least one first location.

Embodiment 44 is the optical system of Embodiment 41, wherein band edge wavelengths of at least one first, second and third locations, the at least one first location near a center of the reflective polarizer and the at least one second and third locations near an edge of the reflective polarizer, are within 2% of each other, the at least one second location and the at least one third location subtending an angle in a range from about 30 degrees to about 110 degrees at the at least one first location.

Embodiment 45 is an optical system for displaying an image to a viewer, comprising:
spaced apart first and second optical lenses, no optical lenses disposed between the first and second optical lenses, the first optical lens comprising a glass, the second optical lens comprising a plastic and opposing aspherical major surfaces, a ratio of radii of curvature of best-fit spheres to the opposing aspherical major surfaces greater than about 1.1;
a partial reflector disposed on and conforming to a curved major surface of the first optical lens and having an average optical reflectance of at least 30% in a predetermined wavelength range;
a reflective polarizer disposed on and conforming to one of the aspherical major surfaces of the second optical lens, the reflective polarizer substantially reflecting light having a first polarization state and substantially transmitting light having an orthogonal second polarization state in the predetermined wavelength range;
a first retarder layer disposed between the reflective polarizer and the partial reflector; and an exit pupil defining an opening therein,
the optical system having an optical axis, a light ray propagating along the optical axis passing through the first and second optical lenses, the partial reflector, the reflective polarizer, and the first retarder layer without being substantially refracted, a cone of light incident on the optical system from an object comprising a spatial frequency of about 40 line pairs per millimeter filling the exit pupil with a chief ray of the cone of light passing through a center of the opening of the exit pupil and making an angle θ with the optical axis, such that for at least one larger θ and at least one smaller θ, each greater than about 5 degrees, the optical system has a smaller modulation transfer function (MTF) for the larger θ and a larger MTF for a smaller θ.

Embodiment 46 is the optical system of Embodiment 45, wherein the ratio of radii of curvature of the best-fit spheres to the opposing aspherical major surfaces is greater than about 1.5.

Embodiment 47 is the optical system of Embodiment 45, wherein for normally incident light having a wavelength in the predetermined wavelength range, maximum transmittances of at least one first, second and third locations, the at least one first location near a center of the reflective polarizer and the at least one second and third locations near an edge of the reflective polarizer, are within 1% of each other, the at least one second location and the at least one third location subtending an angle in a range from about 30 degrees to about 110 degrees at the at least one first location.

Embodiment 48 is the optical system of Embodiment 45, wherein band edge wavelengths of at least one first, second and third locations, the at least one first location near a center of the reflective polarizer and the at least one second and third locations near an edge of the reflective polarizer, are within 2% of each other, the at least one second location and the at least one third location subtending an angle in a range from about 30 degrees to about 110 degrees at the at least one first location.

Embodiment 49 is an optical system for displaying an image to a viewer, comprising:
a first optical lens having an optical birefringence less than about 15 nm/cm and having a curved first major surface and an opposite substantially flat second major surface;
a partial reflector disposed on and conforming to the curved first major surface of the first optical lens and having an average optical reflectance of at least 30% in a predetermined wavelength range;
a first retarder layer disposed on and conforming to the substantially flat second major surface of the first optical lens;
a second optical lens adjacent the first optical lens and having an optical birefringence greater than about 15 nm/cm, the second optical lens comprising a curved first major surface facing the first retarder layer and an opposite curved second major surface; and
a reflective polarizer disposed on and conforming to the curved first major surface of the second optical lens, for normally incident light having a wavelength in the predetermined wavelength range, each location on the reflective polarizer having a maximum reflectance greater than about 70% for a first polarization state, a maximum transmittance greater than about 70% for an orthogonal second polarization state, and a minimum transmittance for the first polarization state, such that the maximum transmittances of at least one first, second and third locations, the at least one first location near a center of the reflective polarizer and the at least one second and third locations near an edge of the reflective polarizer, are within 1% of each other, the at least one second location and the at least one third location subtending an angle in a range from about 30 degrees to about 110 degrees at the at least one first location.

Embodiment 50 is the optical system of Embodiment 49 having an optical axis, a light ray propagating along the optical axis passing through the first and second optical lenses, the partial reflector, the reflective polarizer, and the first retarder layer without being substantially refracted, such that for a cone of light incident on the optical system from an object comprising a spatial frequency of about 40 line pairs per millimeter filling the exit pupil with a chief ray of the cone of light passing through a center of the opening of the exit pupil and making an angle of about 22.5 degrees with the optical axis, a modulation transfer function (MTF) of the optical system is greater than about 0.2.

Embodiment 51 is the optical system of Embodiment 49 having an optical axis, a light ray propagating along the optical axis passing through the first and second optical lenses, the partial reflector, the reflective polarizer, and the first retarder layer without being substantially refracted, a cone of light incident on the optical system from an object comprising a spatial frequency of about 40 line pairs per millimeter filling the exit pupil with a chief ray of the cone of light passing through a center of the opening of the exit pupil and making an angle θ with the optical axis, such that for at least one larger θ and at least one smaller θ, each greater than about 5 degrees, the optical system has a smaller modulation transfer function (MTF) for the larger θ and a larger MTF for a smaller θ.

Embodiment 52 is the optical system of Embodiment 49, wherein band edge wavelengths of at least one first, second and third locations, the at least one first location near a center of the reflective polarizer and the at least one second and third locations near an edge of the reflective polarizer, are within 2% of each other, the at least one second location and the at least one third location subtending an angle in a range from about 30 degrees to about 110 degrees at the at least one first location.

Embodiment 53 is the optical system of Embodiment 49, wherein the first curved major surface of the first optical lens has a best-fit spherical first radius of curvature in a range from about 20 mm to about 200 mm.

Embodiment 54 is the optical system of Embodiment 49, wherein the first curved major surface of the second optical lens has a best-fit spherical first radius of curvature in a range from about 14 mm to about 250 mm.

Embodiment 55 is an optical system for displaying an image to a viewer, comprising:
a first optical lens having an optical birefringence less than about 15 nm/cm and having a curved first major surface and an opposite substantially flat second major surface;
a partial reflector disposed on and conforming to the curved first major surface of the first optical lens and having an average optical reflectance of at least 30% in a predetermined wavelength range;
a first retarder layer disposed on and conforming to the substantially flat second major surface of the first optical lens;
a second optical lens adjacent the first optical lens and having an optical birefringence greater than about 15 nm/cm, the second optical lens comprising a curved first major surface facing the first retarder layer and an opposite curved second major surface; and
a reflective polarizer disposed on and conforming to the curved first major surface of the second optical lens, for normally incident light, each location on the reflective polarizer having a corresponding reflection band having a band edge wavelength, such that the band edge wavelengths of at least one first, second and third locations, the at least one first location near a center of the reflective polarizer and the at least one second and third locations near an edge of the reflective polarizer, are within 2% of each other, the at least one second location and the at least one third location subtending an angle in a range from about 30 degrees to about 110 degrees at the at least one first location.

Embodiment 56 is the optical system of Embodiment 55 having an optical axis, a light ray propagating along the optical axis passing through the first and second optical lenses, the partial reflector, the reflective polarizer, and the first retarder layer without being substantially refracted, such that for a cone of light incident on the optical system from an object comprising a spatial frequency of about 40 line pairs per millimeter filling the exit pupil with a chief ray of the cone of light passing through a center of the opening of the exit pupil and making an angle of about 22.5 degrees with the optical axis, a modulation transfer function (MTF) of the optical system is greater than about 0.2.

Embodiment 57 is the optical system of Embodiment 55 having an optical axis, a light ray propagating along the optical axis passing through the first and second optical lenses, the partial reflector, the reflective polarizer, and the first retarder layer without being substantially refracted, a cone of light incident on the optical system from an object comprising a spatial frequency of about 40 line pairs per millimeter filling the exit pupil with a chief ray of the cone of light passing through a center of the opening of the exit pupil and making an angle θ with the optical axis, such that for at least one larger θ and at least one smaller θ, each greater than about 5 degrees, the optical system has a smaller modulation transfer function (MTF) for the larger θ and a larger MTF for a smaller θ.

Embodiment 58 is the optical system of Embodiment 55, wherein for normally incident light having a wavelength in the predetermined wavelength range, maximum transmittances of at least one first, second and third locations, the at least one first location near a center of the reflective polarizer and the at least one second and third locations near an edge of the reflective polarizer, are within 1% of each other, the at least one second location and the at least one third location subtending an angle in a range from about 30 degrees to about 110 degrees at the at least one first location.

Embodiment 59 is the optical system of Embodiment 55, wherein the first curved major surface of the first optical lens has a best-fit spherical first radius of curvature in a range from about 20 mm to about 200 mm.

Embodiment 60 is the optical system of Embodiment 55, wherein the first curved major surface of the second optical lens has a best-fit spherical first radius of curvature in a range from about 14 mm to about 250 mm.

Embodiment 61 is a method of fabricating an optical assembly, comprising:
providing a first mold comprising a first curved mold surface having a best-fit spherical first radius of curvature in a range from about 30 mm to about 1000 mm;
providing a substantially flat reflective polarizer, each location on the reflective polarizer having a maximum reflectance greater than about 70% for a block polarization state and a maximum transmittance greater than about 70% for an orthogonal pass polarization state, a maximum variation of an orientation of the pass polarization state across the reflective polarizer being about θ1 degrees;
placing the substantially flat reflective polarizer on the first curved mold surface and applying at least one of pressure and heat to at least partially conform the substantially flat reflective polarizer to the first curved mold surface;
providing a second mold comprising a second mold surface spaced apart from and aligned with the first mold surface, the first and second mold surfaces defining a mold cavity therebetween;
substantially filling the mold cavity with a flowable material having a temperature greater than a glass transition temperature of the reflective polarizer; and
solidifying the flowable material to form a solid optical element bonded to the reflective polarizer, a maximum variation of an orientation of the pass polarization state across the bonded reflective polarizer being about θ2 degrees, θ1 and θ2 being within about 3 degrees of each other.

Embodiment 62 is the method of Embodiment 61, wherein the first mold is a first mold insert.

Embodiment 63 is the method of Embodiment 61, wherein the second mold is a second mold insert.

Embodiment 64 is the method of Embodiment 61, wherein the mold cavity is substantially filled with the flowable material through a gate connected to the mold cavity.

Embodiment 65 is the method of Embodiment 61, wherein the solid optical element is permanently bonded to the reflective polarizer.

Embodiment 66 is the method of Embodiment 61, wherein the solid optical element is releasably bonded to the reflective polarizer.

Embodiment 67 is the method of Embodiment 61, wherein a ratio of a sag to the best-fit spherical first radius of curvature of the first curved mold surface is in a range from about 0.02 to about 0.2.

Embodiment 68 is the method of Embodiment 61, wherein the substantially flat reflective polarizer is stretched along a first axis, and the flowable material flows into the mold cavity along a second direction substantially perpendicular to the first axis.

Embodiment 69 is the method of Embodiment 61, wherein the substantially flat reflective polarizer is stretched along a first axis, and the flowable material flows into the mold cavity along the first axis.

Embodiment 70 is the method of Embodiment 61, wherein the substantially flat reflective polarizer comprises a plurality of interference layers, each interference layer reflecting or transmitting light primarily by optical interference.

Embodiment 71 is the method of Embodiment 61, wherein θ1 and θ2 are within about 2 degrees of each other.

Embodiment 72 is the method of Embodiment 61, wherein θ1 and θ2 are within about 1 degree of each other.

Embodiment 73 is the method of Embodiment 61, wherein θ1 is 0.5 degrees and θ2 is 1 degree.

Embodiment 74 is the method of Embodiment 61, wherein θ1 is 0.3 degrees and θ2 is 0.5 degrees.

Embodiment 75 is the method of Embodiment 61, wherein the first curved mold surface has a first average surface roughness, wherein the placing step comprises placing the substantially flat reflective polarizer on the first curved mold surface with a first major surface of the reflective polarizer facing the first curved mold surface, and wherein after the solidifying step, the first major surface of the bonded reflective polarizer has a second average surface roughness greater than the first average surface roughness.

Embodiment 76 is the method of Embodiment 61, wherein the substantially flat reflective polarizer has a first maximum thickness variation across the reflective polarizer, and the bonded reflective polarizer has a second maximum thickness variation across the reflective polarizer, the first and second maximum thickness variations being within 5% of each other.

Embodiment 77 is a method of fabricating an optical assembly, comprising:
providing a first mold comprising a first curved mold surface having a best-fit spherical first radius of curvature in a range from about 30 mm to about 1000 mm;
providing a substantially flat reflective polarizer having an average optical transmittance greater than about 70% for a first polarization state and an average optical reflectance greater than about 70% for an orthogonal second polarization state;
placing the substantially flat reflective polarizer on the first curved mold surface with a first major surface of the reflective polarizer facing the first curved mold surface and having a first average surface roughness;
applying at least one of pressure and heat to at least partially conform the substantially flat reflective polarizer to the first curved mold surface;

providing a second mold comprising a second mold surface spaced apart from and aligned with the first mold surface, the first and second mold surfaces defining a mold cavity therebetween;

substantially filling the mold cavity with a flowable material having a temperature greater than a glass transition temperature of the reflective polarizer; and solidifying the flowable material to form a solid optical element bonded to the reflective polarizer, the first major surface of the bonded reflective polarizer having a second average surface roughness greater than the first average surface roughness.

Embodiment 78 is the method of Embodiment 77, wherein the first average surface roughness is about 0.05 micrometers and the second average surface roughness is about 0.1 micrometers.

Embodiment 79 is the method of Embodiment 77, wherein the substantially flat reflective polarizer has a first maximum thickness variation across the reflective polarizer, and the bonded reflective polarizer has a second maximum thickness variation across the reflective polarizer, the first and second maximum thickness variations being within 5% of each other.

Embodiment 80 is the method of Embodiment 77, wherein the substantially flat reflective polarizer has a maximum variation of an orientation of a pass polarization state across the reflective polarizer of about θ1 degrees, and wherein a maximum variation of an orientation of the pass polarization state across the bonded reflective polarizer is about θ2 degrees, θ1 and θ2 being within about 3 degrees of each other.

Embodiment 81 is a method of fabricating an optical assembly, comprising:

providing a first mold comprising a first curved mold surface having a best-fit spherical first radius of curvature in a range from about 30 mm to about 1000 mm;

providing a substantially flat reflective polarizer having an average reflectance greater than about 70% for a first polarization state in a predetermined wavelength range and an average transmittance greater than about 70% for an orthogonal second polarization state in the predetermined wavelength range, the substantially flat reflective polarizer having a first maximum thickness variation across the reflective polarizer;

placing the substantially flat reflective polarizer on the first curved mold surface and applying at least one of pressure and heat to at least partially conform the substantially flat reflective polarizer to the first curved mold surface;

providing a second mold comprising a second mold surface spaced apart from and aligned with the first mold surface, the first and second mold surfaces defining a mold cavity therebetween;

substantially filling the mold cavity with a flowable material having a temperature greater than a glass transition temperature of the reflective polarizer; and solidifying the flowable material to form a solid optical element bonded to the reflective polarizer, the bonded reflective polarizer having a second maximum thickness variation across the reflective polarizer, the first and second maximum thickness variations within 5% of each other.

Embodiment 82 is the method of Embodiment 81, wherein the first and second maximum thickness variations are within 4% of each other.

Embodiment 83 is the method of Embodiment 81, wherein the first and second maximum thickness variations are within 3% of each other.

Embodiment 84 is the method of Embodiment 81, wherein the first and second maximum thickness variations are within 2% of each other.

Embodiment 85 is the method of Embodiment 81, wherein the first and second maximum thickness variations are within 1% of each other.

Embodiment 86 is the method of Embodiment 81, wherein the substantially flat reflective polarizer has a maximum variation of an orientation of a pass polarization state across the reflective polarizer of about θ1 degrees, and wherein a maximum variation of an orientation of the pass polarization state across the bonded reflective polarizer is about θ2 degrees, θ1 and θ2 being within about 3 degrees of each other.

Embodiment 87 is the method of Embodiment 81, wherein the first curved mold surface has a first average surface roughness, wherein the placing step comprises placing the substantially flat reflective polarizer on the first curved mold surface with a first major surface of the reflective polarizer facing the first curved mold surface, and wherein after the solidifying step, the first major surface of the bonded reflective polarizer has a second average surface roughness greater than the first average surface roughness.

Embodiment 88 is a unitary multilayer optical film, comprising:

a plurality of interference layers, each interference layer reflecting or transmitting light primarily by optical interference; and an outermost noninterference layer not reflecting or transmitting light primarily by optical interference and comprising an outermost surface comprising a regular pattern formed therein, wherein the multilayer optical film is a unitary construction.

Embodiment 89 is the unitary multilayer optical film of Embodiment 88, wherein the regular pattern comprises a periodic pattern.

Embodiment 90 is the unitary multilayer optical film of Embodiment 88 being a reflective polarizer substantially reflecting light having a first polarization state in a predetermined wavelength range, and substantially transmitting light having an orthogonal second polarization state in the predetermined wavelength range.

Embodiment 91 is an optical assembly comprising an optical lens and the unitary multilayer optical film of Embodiment 88 disposed on and conforming to a major surface of the optical lens.

Embodiment 92 is an optical system comprising the optical assembly of Embodiment 91, a partial reflector disposed adjacent to and spaced apart from the optical assembly, and a retarder layer disposed between the unitary multilayer optical film and the partial reflector.

Embodiment 93 is an optical system comprising:

the unitary multilayer optical film of Embodiment 88;

a first optical lens comprising an optical birefringence less than about 15 nm/cm, a curved first major surface having a best-fit spherical first radius of curvature in a range from about 20 mm to about 200 mm, and an opposing second major surface having a best-fit spherical second radius of curvature greater than about 500 mm, the curved first major surface concave toward the second major surface;

a second optical lens comprising an optical birefringence greater than about 15 nm/cm, a curved first major surface facing and convex toward the second major surface of the first optical lens and having a best-fit spherical first radius of curvature in a range from about 14 mm to about 250 mm, and an opposing second major surface having a best-fit spherical second radius of curvature greater than about 125 mm, wherein the partial reflector is disposed on and conforms to the first curved major surface of the first optical lens and has an average optical reflectance of at least 30% in a predetermined wavelength range;

wherein the unitary multilayer optical film is a reflective polarizer and is disposed on and conforms to the curved first major surface of the second optical lens, the reflective polarizer substantially reflecting light having a first polarization state and substantially transmitting light having an orthogonal second polarization state in the predetermined wavelength range; and wherein the retarder layer is disposed on and conforms to the second major surface of the first optical lens.

Embodiment 94 is an optical system comprising:

the unitary multilayer optical film of Embodiment 88;

spaced apart first and second optical lenses, no optical lenses disposed between the first and second optical lenses, the first optical lens comprising a glass and the second optical lens comprising a plastic, each of the first and second optical lenses comprising opposing first and second major surfaces, a ratio of radii of curvature of best-fit spheres to the first and second major surfaces of the first optical lens greater than about 5, a ratio of radii of curvature of best-fit spheres to the first and second major surfaces of the second optical lens in a range from about 1.5 to 10, wherein the partial reflector is disposed on and conforms to a major surface of the first optical lens and has an average optical reflectance of at least 30% in a predetermined wavelength range;

wherein the unitary multilayer optical film is a reflective polarizer and is disposed on and conforms to a major surface of the second optical lens, the reflective polarizer substantially reflecting light having a first polarization state and substantially transmitting light having an orthogonal second polarization state in the predetermined wavelength range;

wherein the retarder layer is disposed between the reflective polarizer and the partial reflector; and wherein the optical system has an exit pupil defining an opening therein, and an optical axis, a light ray propagating along the optical axis passing through the first and second optical lenses, the partial reflector, the reflective polarizer, and the first retarder layer without being substantially refracted, such that for a cone of light incident on the optical system from an object comprising a spatial frequency of about 40 line pairs per millimeter filling the exit pupil with a chief ray of the cone of light passing through a center of the opening of the exit pupil and making an angle of about 22.5 degrees with the optical axis, a modulation transfer function (MTF) of the optical system is greater than about 0.2.

Embodiment 95 is an optical system comprising:

the unitary multilayer optical film of Embodiment 88;

spaced apart first and second optical lenses, no optical lenses disposed between the first and second optical lenses, the first optical lens comprising a glass and the second optical lens comprising a plastic, each of the first and second optical lenses comprising opposing first and second major surfaces, a ratio of radii of curvature of best-fit spheres to the first and second major surfaces of the first optical lens greater than about 5, a ratio of radii of curvature of best-fit spheres to the first and second major surfaces of the second optical lens in a range from about 1.5 to 10, wherein the partial reflector is disposed on and conforms to a major surface of the first optical lens and has an average optical reflectance of at least 30% in a predetermined wavelength range;

wherein the unitary multilayer optical film is a reflective polarizer and is disposed on and conforms to a major surface of the second optical lens, the reflective polarizer substantially reflecting light having a first polarization state and substantially transmitting light having an orthogonal second polarization state in the predetermined wavelength range;

wherein the retarder layer is disposed between the reflective polarizer and the partial reflector; and wherein the optical system has an exit pupil defining an opening therein, and an optical axis, a light ray propagating along the optical axis passing through the first and second optical lenses, the partial reflector, the reflective polarizer, and the first retarder layer without being substantially refracted, a cone of light incident on the optical system from an object comprising a spatial frequency of about 40 line pairs per millimeter filling the exit pupil with a chief ray of the cone of light passing through a center of the opening of the exit pupil and making an angle $\theta$ with the optical axis, such that for at least one larger $\theta$ and at least one smaller $\theta$, each greater than about 5 degrees, the optical system has a smaller modulation transfer function (MTF) for the larger $\theta$ and a larger MTF for a smaller $\theta$.

Embodiment 96 is the optical system of any one of Embodiments 1 to 60 or 93 to 95, wherein the reflective polarizer and the second optical lens is an optical assembly having a circular diattenuation such that in a top plan view, the circular diattenuation increases from a center of the reflective polarizer to an edge of the reflective polarizer in each of two opposite directions along a first axis and decreases from the center of the reflective polarizer to the edge of the reflective polarizer in each of two opposite directions along a different second axis.

Embodiment 97 is an optical assembly comprising:

an optical lens having a first major surface and an optical birefringence of at least about 15 nm/cm;

a reflective polarizer disposed on and conforming to the first major surface, the optical assembly having a circular diattenuation such that in a top plan view, the circular diattenuation increases from a center of the reflective polarizer to an edge of the reflective polarizer in each of two opposite directions along a first axis and decreases from the center of the reflective polarizer to the edge of the reflective polarizer in each of two opposite directions along a different second axis.

Embodiment 98 is the optical assembly of Embodiment 97, wherein the first and second axes are substantially perpendicular to each other.

Embodiment 99 is the optical assembly of Embodiment 97, wherein the circular diattenuation is between about −0.01 and about 0.01 at a first location near the center of the reflective polarizer and is greater than about 0.02 at a second location along the first axis near the edge of the reflective polarizer and is less than about −0.02 at a third location along the second axis near the edge of the reflective polarizer.

Embodiment 100 is the optical assembly of Embodiment 99, wherein a magnitude of the circular diattenuation at the second location is within 10 percent of a magnitude of the circular diattenuation at the third location.

Embodiment 101 is the optical assembly of Embodiment 97, wherein the circular diattenuation is between about −0.1 and about 0.1 at a first location near the center of the reflective polarizer and is greater than about 0.2 at a second location near the edge of the reflective polarizer and is less than about −0.2 at a third location near the edge of the reflective polarizer.

Embodiment 102 is the optical assembly of Embodiment 101, wherein a magnitude of the circular diattenuation at the second location is within 10 percent of a magnitude of the circular diattenuation at the third location.

Embodiment 103 is the optical assembly of Embodiment 97, wherein the circular diattenuation is determined using a light source facing the reflective polarizer.

Embodiment 104 is the optical assembly of Embodiment 97, wherein the circular diattenuation is determined using a light source facing the optical lens.

Embodiment 105 is the optical assembly of Embodiment 97 comprising an optical axis, the circular diattenuation determined using light incident on the optical assembly parallel to the optical axis.

Embodiment 106 is the optical assembly of Embodiment 97, wherein optical birefringence of the optical lens is at least about 20 nm/cm.

Embodiment 107 is the optical assembly of Embodiment 97, wherein the first major surface has a best-fit spherical first radius of curvature in a range from about 14 mm to about 250 mm.

Embodiment 108 is the optical assembly of Embodiment 107 having a second major surface opposite the first major surface, the second major surface having a best-fit spherical second radius of curvature greater than about 125 mm.

Embodiment 109 is an optical system comprising the optical assembly of Embodiment 97, a partial reflector disposed adjacent to and spaced apart from the optical assembly, and a retarder layer disposed between the partial reflector and the optical assembly.

Embodiment 110 is the optical system of Embodiment 109 further comprising a first optical lens, the partial reflector disposed on a major surface of the first optical lens.

Embodiment 111 is the optical system of Embodiment 110, wherein the partial reflector has an average optical reflectance in a range of 30% to 70% in a predetermined wavelength range.

Embodiment 112 is the optical system of any one of Embodiments 1 to 60, or 93 to 95, or 111, wherein the predetermined wavelength range comprises at least one if a near infrared wavelength range, a visible wavelength range, and a near ultraviolet wavelength range.

Embodiment 113 is the optical system of any one of Embodiments 1 to 60, or 93 to 95, or 111, wherein the predetermined wavelength range is from about 400 nm to about 700 nm.

Embodiment 114 is the optical system of any one of Embodiments 1 to 60, or 93 to 95, or 110 to 111 further comprising a second retarder layer, the first optical lens disposed between the reflective polarizer and the second retarder layer.

Embodiment 115 is the optical system of Embodiment 114, further comprising a linear absorbing polarizer, the second retarder layer disposed between the first optical lens and the linear absorbing polarizer.

Embodiment 116 is the optical system of any one of Embodiments 1 to 60, or 93 to 95, or 109 to 111 further comprising a linear absorbing polarizer, the reflective polarizer disposed between the linear absorbing polarizer and the partial reflector.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. A method of fabricating an optical assembly, comprising:
providing a first mold comprising a first curved mold surface having a best-fit spherical first radius of curvature in a range from about 30 mm to about 1000 mm;
providing a substantially flat reflective polarizer, each location on the reflective polarizer having a maximum reflectance greater than about 70% for a block polarization state and a maximum transmittance greater than about 70% for an orthogonal pass polarization state, a maximum variation of an orientation of the pass polarization state across the reflective polarizer being about θ1 degrees;
placing the substantially flat reflective polarizer on the first curved mold surface and applying at least one of pressure and heat to at least partially conform the substantially flat reflective polarizer to the first curved mold surface;
providing a second mold comprising a second mold surface spaced apart from and aligned with the first mold surface, the first and second mold surfaces defining a mold cavity therebetween;
substantially filling the mold cavity with a flowable material having a temperature greater than a glass transition temperature of the reflective polarizer; and
solidifying the flowable material to form a solid optical element bonded to the reflective polarizer, a maximum variation of an orientation of the pass polarization state across the bonded reflective polarizer being about θ2 degrees, θ1 and θ2 being within about 3 degrees of each other.

2. The method of claim 1, wherein the mold cavity is substantially filled with the flowable material through a gate connected to the mold cavity.

3. The method of claim 1, wherein the solid optical element is permanently bonded to the reflective polarizer.

4. The method of claim 1, wherein a ratio of a sag to the best-fit spherical first radius of curvature of the first curved mold surface is in a range from about 0.02 to about 0.2.

5. The method of claim 1, wherein the substantially flat reflective polarizer is stretched along a first axis, and the flowable material flows into the mold cavity along a second direction substantially perpendicular to the first axis.

6. The method of claim 1, wherein the substantially flat reflective polarizer is stretched along a first axis, and the flowable material flows into the mold cavity along the first axis.

7. The method of claim 1, wherein the substantially flat reflective polarizer comprises a plurality of interference layers, each interference layer reflecting or transmitting light primarily by optical interference.

8. The method of claim 1, wherein θ1 and θ2 are within about 1 degree of each other.

9. The method of claim 1, wherein the first curved mold surface has a first average surface roughness, wherein the placing step comprises placing the substantially flat reflective polarizer on the first curved mold surface with a first major surface of the reflective polarizer facing the first curved mold surface, and wherein after the solidifying step, the first major surface of the bonded reflective polarizer has a second average surface roughness greater than the first average surface roughness.

10. The method of claim 1, wherein the substantially flat reflective polarizer has a first maximum thickness variation across the reflective polarizer, and the bonded reflective polarizer has a second maximum thickness variation across the reflective polarizer, the first and second maximum thickness variations being within 5% of each other.

11. A method comprising:
fabricating an optical assembly according to the method of claim 1; and
disposing a first optical lens proximate the optical assembly such that the reflective polarizer faces the first optical lens, a curved first major surface of the first optical lens having a best-fit spherical first radius of curvature in a range from about 20 mm to about 200 mm, and an opposing second major surface of the first optical lens having a best-fit spherical second radius of curvature greater than about 500 mm, wherein a partial reflector is disposed on and conforms to the first curved major surface of the first optical lens and has an average optical reflectance of at least 30% in a predetermined wavelength range, and wherein a first retarder layer is disposed on and conforms to the second major surface of the first optical lens.

12. A method of fabricating an optical assembly, comprising:
providing a first mold comprising a first curved mold surface having a best-fit spherical first radius of curvature in a range from about 30 mm to about 1000 mm;
providing a substantially flat reflective polarizer having an average optical transmittance greater than about 70% for a first polarization state and an average optical reflectance greater than about 70% for an orthogonal second polarization state;
placing the substantially flat reflective polarizer on the first curved mold surface with a first major surface of the reflective polarizer facing the first curved mold surface and having a first average surface roughness;
applying at least one of pressure and heat to at least partially conform the substantially flat reflective polarizer to the first curved mold surface;
providing a second mold comprising a second mold surface spaced apart from and aligned with the first mold surface, the first and second mold surfaces defining a mold cavity therebetween;
substantially filling the mold cavity with a flowable material having a temperature greater than a glass transition temperature of the reflective polarizer; and
solidifying the flowable material to form a solid optical element bonded to the reflective polarizer, the first major surface of the bonded reflective polarizer having a second average surface roughness greater than the first average surface roughness.

13. The method of claim 12, wherein the first average surface roughness is about 0.05 micrometers and the second average surface roughness is about 0.1 micrometers.

14. The method of claim 12, wherein the substantially flat reflective polarizer has a first maximum thickness variation across the reflective polarizer, and the bonded reflective polarizer has a second maximum thickness variation across the reflective polarizer, the first and second maximum thickness variations being within 5% of each other.

15. The method of claim 12, wherein the substantially flat reflective polarizer has a maximum variation of an orientation of a pass polarization state across the reflective polarizer of about θ1 degrees, and wherein a maximum variation of an orientation of the pass polarization state across the bonded reflective polarizer is about θ2 degrees, θ1 and θ2 being within about 3 degrees of each other.

16. A method of fabricating an optical assembly, comprising:
providing a first mold comprising a first curved mold surface having a best-fit spherical first radius of curvature in a range from about 30 mm to about 1000 mm;
providing a substantially flat reflective polarizer having an average reflectance greater than about 70% for a first polarization state in a predetermined wavelength range and an average transmittance greater than about 70% for an orthogonal second polarization state in the predetermined wavelength range, the substantially flat reflective polarizer having a first maximum thickness variation across the reflective polarizer;
placing the substantially flat reflective polarizer on the first curved mold surface and applying at least one of pressure and heat to at least partially conform the substantially flat reflective polarizer to the first curved mold surface;
providing a second mold comprising a second mold surface spaced apart from and aligned with the first mold surface, the first and second mold surfaces defining a mold cavity therebetween;
substantially filling the mold cavity with a flowable material having a temperature greater than a glass transition temperature of the reflective polarizer; and
solidifying the flowable material to form a solid optical element bonded to the reflective polarizer, the bonded reflective polarizer having a second maximum thickness variation across the reflective polarizer, the first and second maximum thickness variations within 5% of each other.

17. The method of claim 16, wherein the first and second maximum thickness variations are within 3% of each other.

18. The method of claim 16, wherein the first and second maximum thickness variations are within 1% of each other.

19. The method of claim 16, wherein the substantially flat reflective polarizer has a maximum variation of an orientation of a pass polarization state across the reflective polarizer of about θ1 degrees, and wherein a maximum variation of an orientation of the pass polarization state across the bonded reflective polarizer is about θ2 degrees, θ1 and θ2 being within about 3 degrees of each other.

20. The method of claim 16, wherein the first curved mold surface has a first average surface roughness, wherein the placing step comprises placing the substantially flat reflective polarizer on the first curved mold surface with a first major surface of the reflective polarizer facing the first curved mold surface, and wherein after the solidifying step, the first major surface of the bonded reflective polarizer has a second average surface roughness greater than the first average surface roughness.

* * * * *